US012754610B2

(12) United States Patent
Yokoyama et al.

(10) Patent No.: US 12,754,610 B2
(45) Date of Patent: Oct. 6, 2026

(54) INFORMATION PROCESSING SYSTEM, CONTROL METHOD, AND CONTROL PROGRAM

(71) Applicant: SONY GROUP CORPORATION, Tokyo (JP)

(72) Inventors: Ryo Yokoyama, Tokyo (JP); Minatsu Sugimoto, Toyko (JP); Yusuke Nakagawa, Tokyo (JP); Osamu Ito, Tokyo (JP); Ayumi Nakagawa, Tokyo (JP); Keijiroh Nagano, Tokyo (JP); Ikuo Yamano, Tokyo (JP); Takayoshi Yamasaki, Tokyo (JP); Yohei Fukuma, Tokyo (JP)

(73) Assignee: Sony Group Corporation, Tokyo (JP)

( * ) Notice: Subject to any disclaimer, the term of this patent is extended or adjusted under 35 U.S.C. 154(b) by 78 days.

(21) Appl. No.: 18/698,942

(22) PCT Filed: Oct. 4, 2022

(86) PCT No.: PCT/JP2022/037069
§ 371 (c)(1),
(2) Date: Apr. 5, 2024

(87) PCT Pub. No.: WO2023/063161
PCT Pub. Date: Apr. 20, 2023

(65) Prior Publication Data

US 2024/0427422 A1 Dec. 26, 2024

(30) Foreign Application Priority Data

Oct. 12, 2021 (JP) ................................ 2021-167513

(51) Int. Cl.
*G06F 3/01* (2006.01)
*G06V 20/64* (2022.01)

(52) U.S. Cl.
CPC .............. *G06F 3/016* (2013.01); *G06V 20/64* (2022.01)

(58) Field of Classification Search
CPC ........ G06F 3/041; G06F 3/0304; G06F 3/016; G06F 3/0346; G06F 3/01; G06V 20/64
See application file for complete search history.

(56) References Cited

U.S. PATENT DOCUMENTS 8,508,469 B1 * 8/2013 Rosenberg ............. G01B 21/04 345/156
9,030,411 B2 * 5/2015 Itkowitz .................. G06T 15/20 345/156

(Continued)

FOREIGN PATENT DOCUMENTS

CN 110917613 A 3/2020
JP 2010-099197 A 5/2010

(Continued)

OTHER PUBLICATIONS

Search Report issued in International Patent Application No. PCT/JP2022/037069, mailed Dec. 20, 2022 and English translation of same. 5 pages.

(Continued)

*Primary Examiner* — Olga V Merkoulova
(74) *Attorney, Agent, or Firm* — K&L Gates LLP

(57) ABSTRACT

An information processing system includes the following units. A signal generation unit 303 generates a vibration signal on the basis of vibration measured by a microphone 110 provided at a mat speaker 10 and a result of detection of an object placed on the mat speaker 10. A signal output unit 392 vibrates a vibrator 120 on the basis of the vibration signal generated by the signal generation unit 303.

14 Claims, 26 Drawing Sheets

(56) References Cited

U.S. PATENT DOCUMENTS

| | | | | |
|---|---|---|---|---|
| 9,268,410 | B2 * | 2/2016 | Kasahara | G06F 3/04842 |
| 9,946,336 | B2 * | 4/2018 | Levesque | G06T 19/006 |
| 2011/0102160 | A1 * | 5/2011 | Heubel | G06F 3/011<br>340/407.1 |
| 2013/0100008 | A1 * | 4/2013 | Marti | G06F 3/013<br>345/156 |
| 2013/0328762 | A1 * | 12/2013 | McCulloch | G06F 3/016<br>345/156 |
| 2014/0176432 | A1 * | 6/2014 | Park | G06F 3/016<br>345/156 |
| 2015/0015607 | A1 * | 1/2015 | Sodhi | G06F 3/0425<br>345/633 |
| 2015/0316985 | A1 * | 11/2015 | Levesque | G06F 3/016<br>345/156 |
| 2017/0255255 | A1 * | 9/2017 | Levesque | G06F 3/011 |
| 2017/0351325 | A1 * | 12/2017 | Hashimoto | A63F 13/213 |
| 2018/0122197 | A1 * | 5/2018 | Wu | G06V 20/40 |
| 2019/0270014 | A1 * | 9/2019 | Chou | G06F 3/016 |

FOREIGN PATENT DOCUMENTS

| | | | | |
|---|---|---|---|---|
| JP | 2011-501575 | A | 1/2011 | |
| JP | 2015-156229 | A | 8/2015 | |
| JP | 2015-212946 | A | 11/2015 | |
| JP | 2017-220032 | A | 12/2017 | |
| JP | 2018-073424 | A | 5/2018 | |
| KR | 20160133113 | A * | 11/2016 | A47G 27/0243 |

OTHER PUBLICATIONS

Written Opinion issued in International Patent Application No. PCT/JP2022/037069, mailed Dec. 20, 2022. 4 pages.

Liu Jian et al: “VibSense: Sensing Touches on Ubiquitous Surfaces through vibration”, 2017 14th Annual IEEE International Conference in Sensing, Communication, and Networking (SECON), IEEE, Jun. 12, 2017 (Jun. 12, 2017), pp. 1-9, XP033113396, doi: 10.1109/sahcn. 2017. 7964907.

* cited by examiner

INFORMATION PROCESSING SYSTEM, CONTROL METHOD, AND CONTROL PROGRAM

FIELD

The present disclosure relates to an information processing system, a control method, and a control program.

BACKGROUND

From the viewpoint of countermeasures against infectious diseases, reduction in costs, and the like in recent years, companies introducing working from home as a work pattern for employees are increasing. An employee working from home performs work on his/her own terminal device by remotely accessing an in-house server, using data or the like stored in the server. In addition, the employee working from home often uses his/her own terminal device, for conferences, meetings, and the like online via various applications.

Communication in a remote environment such as working from home is mainly performed using sound and video. For example, for a remote conference, sound picked up by a microphone and a video captured by a camera are output to terminals of other participants of the conference. Participants of the conference confirm the facial expressions of the respective participants in the video, and the conference is advanced on the basis of the contents of the words output as the sound.

In this way, as a technology for conveying various information to other persons connected online, the following technologies have been proposed. For example, a technology has been proposed to collect relevant data associated with a video event in video data captured by a camera, select a feature parameter based on the collected relevant data according to the type of the video event, and generate tactile effects from the selected feature parameter. In addition, a technology has been proposed to add tactile information to a medium file together with a time stamp, as tag information, reproduce sound data or video content on the basis of the medium file, and output the tactile information added as the tag information.

CITATION LIST

Patent Literature

Patent Literature 1: JP 2018-73424 A
Patent Literature 2: JP 2011-501575 A

SUMMARY

Technical Problem

However, in a case where the work pattern is shifted from working in office to working from home, it may be difficult to understand what a person is feeling, only from the sound and the video captured by the camera. Therefore, the remote environment tends to provide insufficient communication with other persons.

Therefore, the present disclosure provides an information processing system, a control method, and a control program that activate communication with other persons, in the remote environment.

Solution to Problem

According to the present disclosure, a signal generation unit generates a vibration signal based on vibration measured by a vibration sensor provided at a mat and a result of detection of an object placed on the mat. A signal output unit vibrates a vibration mechanism based on the vibration signal generated by the signal generation unit.

DESCRIPTION OF EMBODIMENTS

Figure 1:
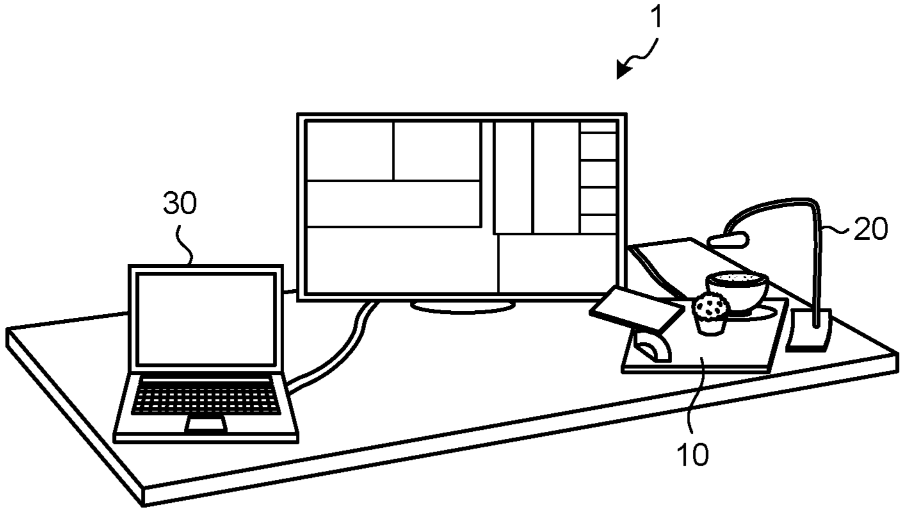
FIG. 1 is a schematic diagram of a remote communication system according to a first embodiment.

Embodiments of the present disclosure will be described below in detail with reference to the drawings. Note that in the following embodiments, the same portions are denoted by the same reference numerals and symbols, and a repetitive description thereof will be omitted.

First Embodiment

System Configuration According to First Embodiment

FIG. 1 is a schematic diagram of a remote communication system according to a first embodiment. In a case where a work pattern is shifted from working in office to working from home, it may be difficult to understand what a person is feeling, only from sound and a video captured by a camera. For communication with another person, it is important to understand what the other person is feeling or understand the situations of the other person, but a remote environment makes it difficult to grasp her/his feeling and situation, and therefore, it is considered that communication with the other person is made difficult.

For example, in the remote environment, chatting opportunity tends to decrease. A survey shows the result that the largest number of people answer that the frequency of chats is three times per day when they were in the office, whereas the largest number of people answer that the frequency of chats is approximately once in three days in the remote environment.

Furthermore, in the remote environment, opportunities for a person to start a chat by him-/her-self also tend to decrease. For example, in a survey, the largest number of people answered that the ratio of starting chats by themselves in the chat was approximately 20% in any work pattern of working in office or working from home. However, the survey shows the result that the number of people who answered 20% was decreased and the number of people who answered 0 was increased in the remote environment, as compared with working in office.

In this way, there is a big psychological hurdle in the remote environment for each of the people to have a chat, making easily talking with other people difficult. The reduced chats may cause various adverse effects such as difficulty in asking someone's advice and difficulty in obtaining various information related to work, thereby possibly causing adverse effects such as a decrease in work efficiency.

Therefore, in order to activate communication with another person in the remote environment, in the remote communication system 1 according to the present embodiment, a mat speaker 10 and a camera 20 are arranged, in addition to a terminal device 30 for communication, as illustrated in FIG. 1. Both the mat speaker 10 and the camera 20 are connected to the terminal device 30.

Figure 2:
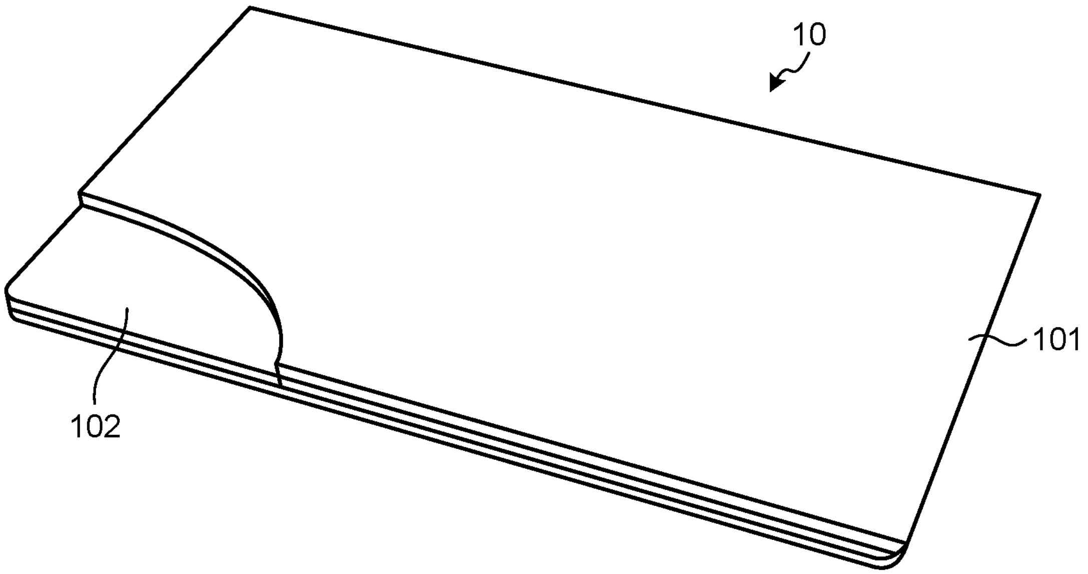
FIG. 2 is a schematic perspective view of a mat speaker.

FIG. 2 is a schematic perspective view of the mat speaker. As illustrated in FIG. 2, the mat speaker 10 includes a top plate 101 and a communication mechanism 102. As illustrated in FIG. 1, various objects are allowed to be placed on the top plate 101.

Figure 3:
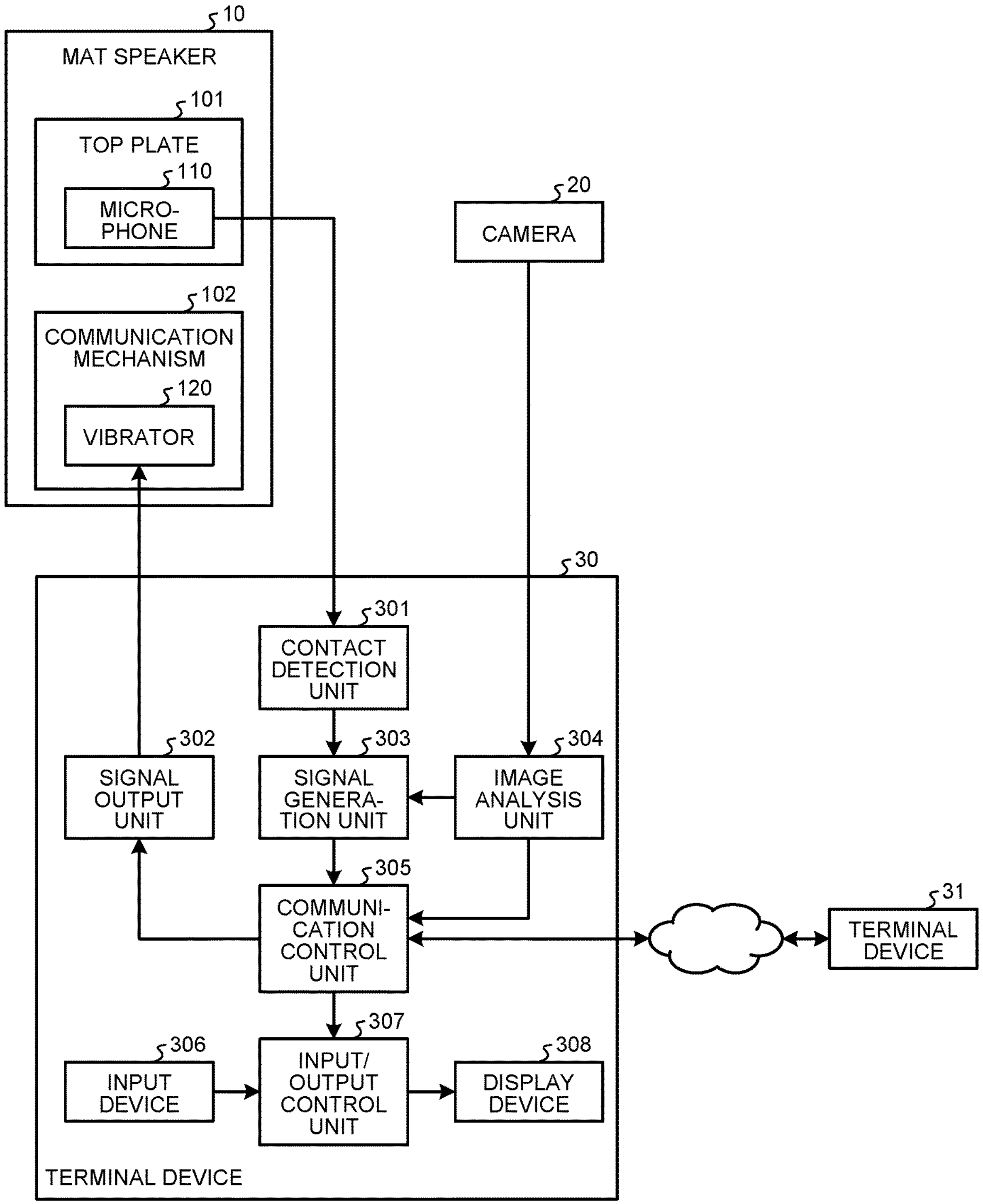
FIG. 3 is a block diagram of the remote communication system according to the first embodiment.

FIG. 3 is a block diagram of the remote communication system according to the first embodiment. The top plate 101 is provided with a microphone 110. Furthermore, the communication mechanism 102 is provided with a call button and a vibrator 120.

An operator who performs remote communication by using the mat speaker 10 uses the microphone 110 provided at the top plate 101 to transmit sound to a person on the other end of the line. Furthermore, the microphone 110 also functions as a vibration sensor, and detects the weight, arrangement position, contact speed, and the like of an object arranged on the top plate 101.

In addition, when the operator brings his/her finger into contact with the vibrator 120 of the communication mechanism 102, the operator can feel vibration on the finger. Furthermore, even in a state where the finger is separated from the vibrator 120, the operator can feel the vibration of the vibrator 120 due to the vibration of air or the like. An eccentric motor or the like may be added to the vibrator 120 so that the operator can more easily feel the vibration with the finger separated. In addition, pressing the call button provided in the communication mechanism 102 by the operator makes it possible for the operator to talk with a person with whom the operator remotely communicates, by using the microphone 110 provided at the top plate 101, and the sound is transmitted to the person.

The camera 20 captures an image from a side facing the top plate 101. It is preferable for the camera 20 not to capture an image of a region displaced from the top plate 101, and it is more preferable to have an angle of view for capturing an image of the entire surface of the top plate 101. The image captured by the camera 20 is transmitted to the terminal device 30.

In this way, the remote communication system 1 as the information processing system includes the mat speaker 10 that serves as a mat, the vibrator 120 that is a vibration mechanism, and the terminal device 30. Furthermore, the mat includes the microphone 110 as the vibration sensor. Furthermore, the camera 20 captures an image of an object placed on the top plate 101.

Configuration of Terminal Device

Next, details of the terminal device 30 that is an information processing device will be described with reference to FIG. 3. As illustrated in FIG. 3, the terminal device 30 includes a contact detection unit 301, a signal output unit 302, a signal generation unit 303, an image analysis unit 304, a communication control unit 305, an input device 306, an input/output control unit 307, and a display device 308. The terminal device 30 is connected to a terminal device 31 that is used by the person with whom the operator remotely communicates, via a network.

The input device 306 is, for example, a keyboard or a mouse. Furthermore, the display device 308 is, for example, a monitor. The operator refers to a screen displayed on the display device 308 to input a command to the terminal device 30, with the input device 306.

Figure 4:
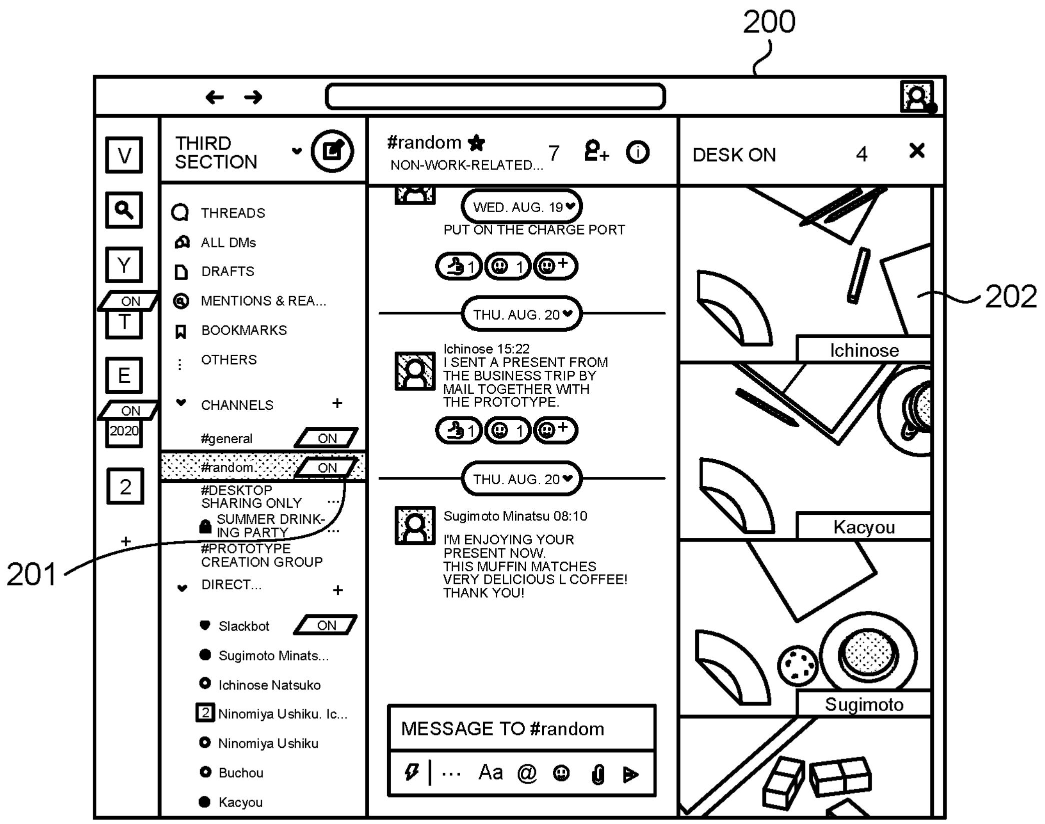
FIG. 4 is a diagram illustrating an example of an operation screen of an application for performing remote communication.

FIG. 4 is a diagram illustrating an example of an operation screen of an application for performing remote communication. For example, the operation screen 200 as illustrated in FIG. 4 is displayed on the display device 308. The operator selects one or a plurality of persons with whom the operator remotely communicates, with the input device 306, on the operation screen 200 displayed on the display device 308, and starts the remote communication.

Furthermore, the operator uses the input device 306 to operate a button 201 for turning on and off transmission and reception of the video, and selects whether to perform mutual transmission and reception of the video captured by the camera 20. When the button 201 is turned on, the image of the camera 20 is transmitted and received between the terminal device 30 operated by the operator and the terminal device 31 operated by the person on the other end of the line. The image of the camera 20 transmitted from the terminal device 31 is displayed as an image 202 on the operation screen 200. In addition, when the button 201 is turned on, vibration generated on the basis of vibration collected by the microphone 110 of the top plate 101 is mutually transmitted and received between the terminal device 30 operated by the operator and the terminal device 31 operated by the person on the other end of the line.

Returning to FIG. 3, description will be continued. The input/output control unit 307 receives an input of a command or instruction by the operator with the input device 306. For example, when the button 201 in FIG. 4 is turned on with the input device 306, the input/output control unit 307 instructs the communication control unit 305 to transmit the image of the camera 20 and the vibration to the terminal device 31.

Furthermore, the input/output control unit 307 receives, from the communication control unit 305, an input of the image of the camera 20 transmitted from the terminal device 31 via the network. Then, the input/output control unit 307 causes the display device 308 to display the acquired image thereon.

Figure 5:
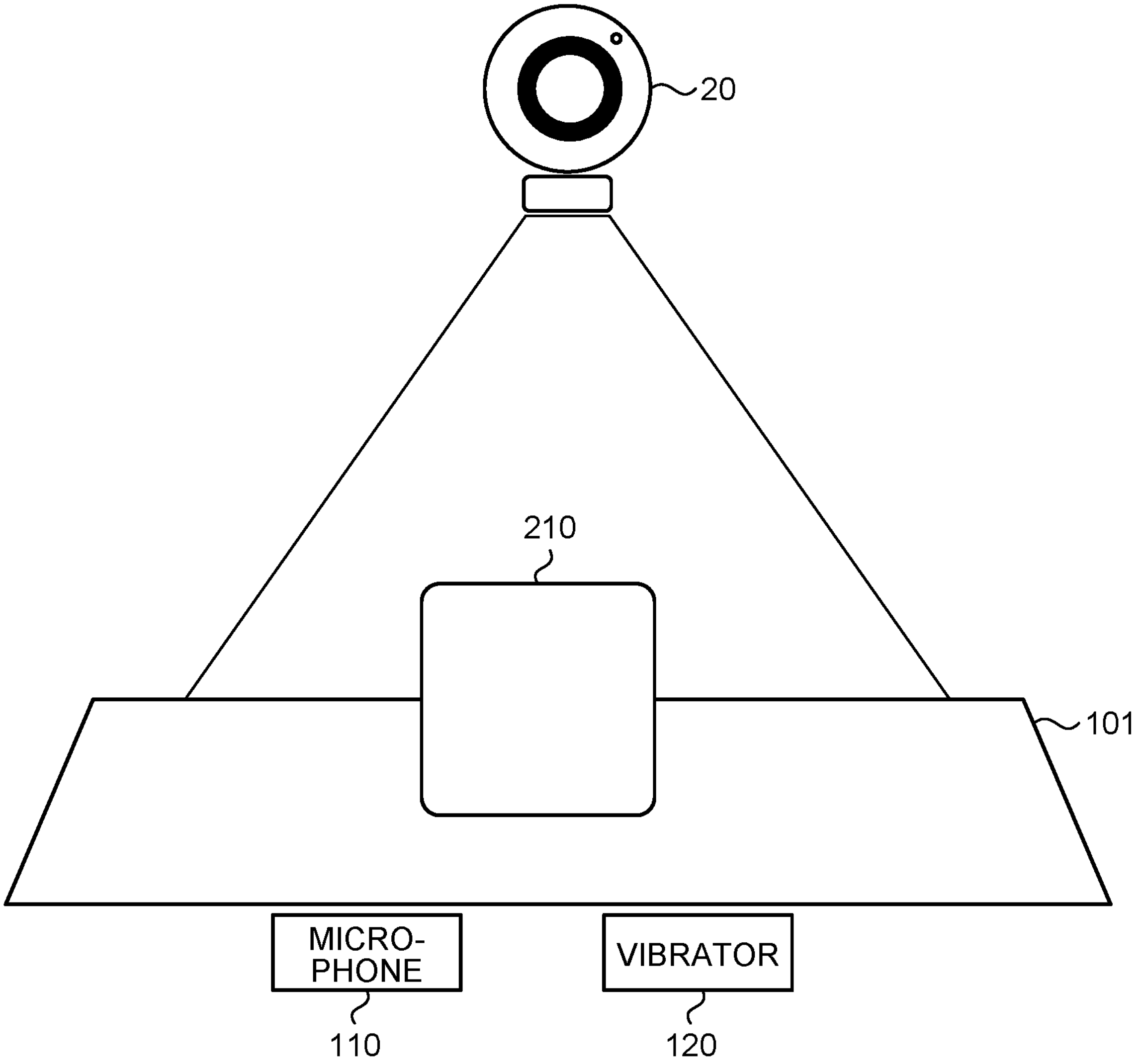
FIG. 5 is a diagram illustrating a state of an object being placed on a top plate.

The contact detection unit 301 receives an input of the sound collected by the microphone 110. In addition, the contact detection unit 301 receives, from the microphone 110, an input of pressure vibration caused upon contact of the object placed on the top plate 101. FIG. 5 is a diagram illustrating a state of the object being placed on the top plate. For example, when an object 210 is placed on the top plate 101 as illustrated in FIG. 5, the microphone 110 collects sound generated upon placing, together with the surrounding sound at that time. Furthermore, the microphone 110 detects pressure vibration generated when the object 210 makes contact with the top plate 101. The contact detection unit 301 receives the sound and pressure vibration collected by the microphone 110.

Returning to FIG. 3, description will be continued. When receiving the input of the sound from the microphone 110, the contact detection unit 301 determines whether the object makes contact with the top plate 101 by using the function of the vibration sensor of the microphone 110. When the object does not make contact with the top plate 101, the contact detection unit 301 outputs the sound collected by the microphone 110 to the signal generation unit 303. Then, the contact detection unit 301 instructs the signal generation unit 303 to generate a signal limited to the sound collected by the microphone 110.

On the other hand, when the contact of the object with the top plate 101 is detected, the contact detection unit 301 determines whether a certain time period such as 1 to 2 seconds has elapsed from a previous contact. This is to prevent unnecessary detection of contact due to chattering is prevented.

When the certain time period has not elapsed from the previous contact, it is determined that chattering has occurred, and the contact detection unit 301 outputs the sound collected by the microphone 110 to the signal generation unit 303. Then, the contact detection unit 301 instructs the signal generation unit 303 to generate the signal limited to the sound collected by the microphone 110.

On the other hand, when the certain time period has elapsed from the previous contact, the contact detection unit 301 determines that the object is placed on the top plate 101. Then, the contact detection unit 301 outputs the sound collected by the microphone 110 to the signal generation unit 303. Furthermore, the contact detection unit 301 instructs the signal generation unit 303 to add a vibration effect based on the image of the camera 20.

The image analysis unit 304 receives an input of the image captured by the camera 20 from the side facing an object mount surface of the top plate 101. Then, the image analysis unit 304 analyzes the image of the camera 20 to recognize the object placed on the top plate 101.

For example, the image analysis unit 304 acquires a large number of pieces of data each obtained by combining an image showing a specific object arranged on the top plate 101 and a name of the specific object, and performs machine learning using the acquired data as training data to generate an image recognition model. Then, the image analysis unit 304 inputs the image of the camera 20 to the image recognition model, for recognition of the object captured in the image. Thereafter, the image analysis unit 304 outputs a result of the recognition of the object placed on the top plate 101, to the signal generation unit 303. The object recognized by the image analysis unit 304 also includes an object in action, such as "a hand pressing the top plate 101" or "a spinning top".

At this time, when the object located at a position outside the angle of view of the camera 20, the image analysis unit 304 outputs a notification indicating absence of the object to the signal generation unit 303, as a result of the recognition. Furthermore, when it is difficult to identify the object, the image analysis unit 304 outputs a notification indicating failure in recognition to the signal generation unit 303, as a result of the recognition.

Figure 6:
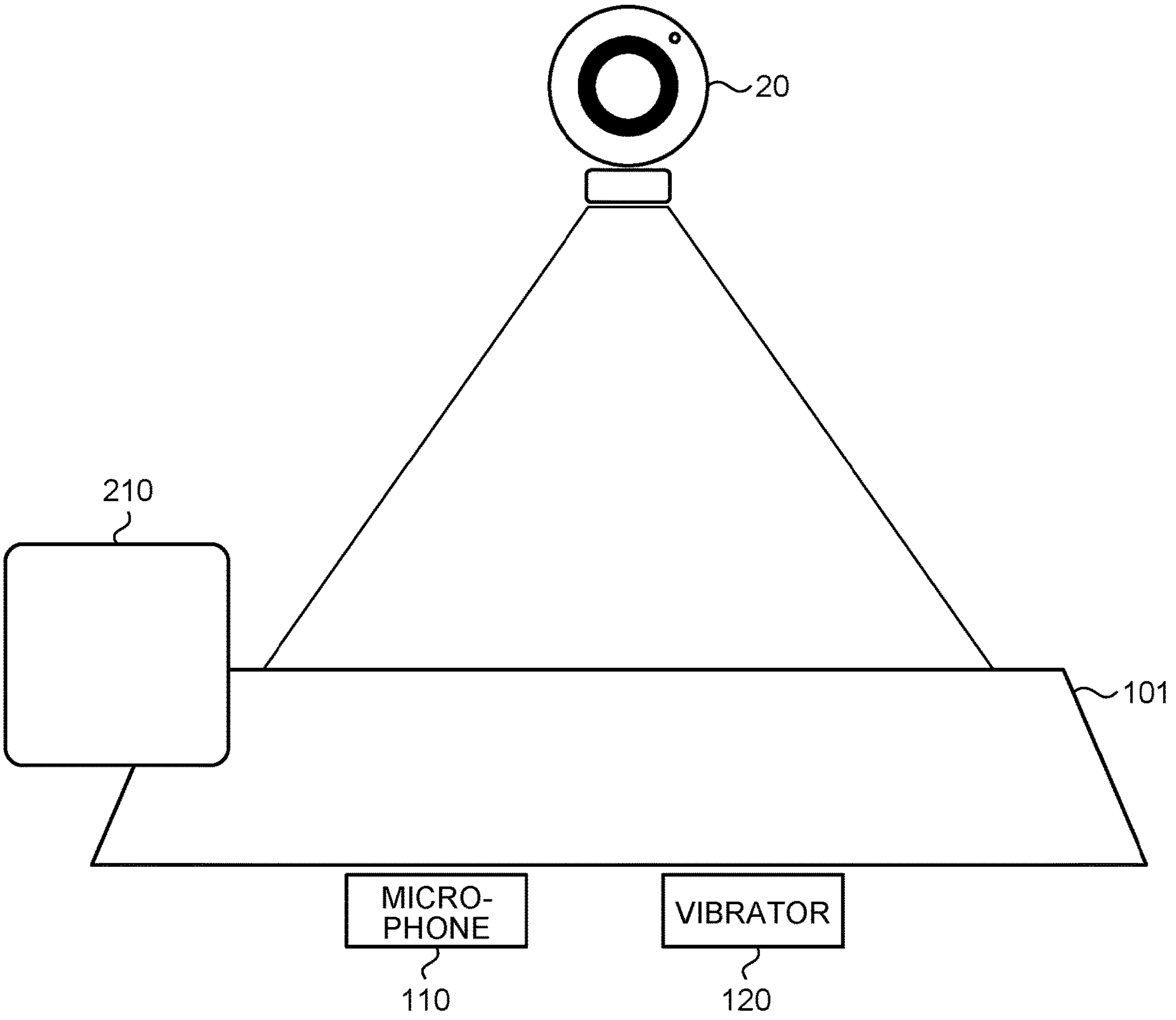
FIG. 6 is a diagram illustrating a state of the object being placed on the top plate outside an angle of view of a camera.

For example, in FIG. 5, the image analysis unit 304 receives an input of an image of the object 210 captured by the camera 20. Then, the image analysis unit 304 determines what the object 210 is, by image analysis. At this time, when the object 210 can be recognized, the image analysis unit 304 outputs the result of the recognition to the signal generation unit 303. On the other hand, when the object 210 is unknown with difficulty in recognition, the image analysis unit 304 outputs a notification indicating failure in recognition of the object 210 to the signal generation unit 303. FIG. 6 is a diagram illustrating a state of the object being placed on the top plate outside the angle of view of the camera. As illustrated in FIG. 6, when the object 210 is outside the angle of view, the image analysis unit 304 does not recognize the object 210 on the top plate 101. In this case, the image analysis unit 304 outputs the notification indicating the absence of the object 210, to the signal generation unit 303.

Furthermore, the image analysis unit 304 outputs the image captured by the camera 20 to the communication control unit 305. However, the image captured by the camera 20 may be directly input to the communication control unit 305.

Returning to FIG. 3, description will be continued. The signal generation unit 303 holds, for each object, vibration pattern information representing a combination of the object with a vibration pattern corresponding to the object in advance. As a combination of each object and the vibration pattern, for example, there is a combination of the object, if being a gun, with a vibration representing firing of the gun, or there is a combination of the object, if having a star shape, with a vibration representing a sound effect such as "sparkle." The objects to be registered in the vibration pattern information include objects recognizable by the image analysis unit 304.

The signal generation unit 303 receives an input of the sound collected by the microphone 110 from the contact detection unit 301. At the same time, the signal generation unit 303 receives either specification of generation of the signal limited to the sound or specification of generation of a signal to which the vibration effect is to be added. Furthermore, the signal generation unit 303 receives an input of the result of the recognition of the image, from the image analysis unit 304.

When the instruction for generation of the signal limited to the sound is given, the signal generation unit 303 converts the sound acquired, into a vibration signal. Furthermore, the signal generation unit 303 performs filter processing by passing the vibration signal after conversion, through a low-pass filter to delete vibration due to unnecessary sound data. Then, the signal generation unit 303 outputs the vibration signal to the communication control unit 305.

On the other hand, when the instruction for generation of the signal to which the vibration effect is to be added, the signal generation unit 303 determines whether the recognition of the image has been successfully performed, the object is absent, or the recognition has failed, from the result of the recognition of the image. When the result of the recognition of the image indicates the absence of the object or the failure in recognition is notified of, the signal generation unit 303 generates the signal limited to the sound collected by the microphone 110. In other words, the signal generation unit 303 converts the acquired sound into signal vibration. Furthermore, the signal generation unit 303 performs filter processing by passing the vibration signal after conversion, through a low-pass filter to delete vibration due to unnecessary sound data. Then, the signal generation unit 303 outputs the vibration signal to the communication control unit 305.

On the other hand, when the recognition of the image has been successfully performed, the signal generation unit 303 converts the acquired sound into the vibration signal. Next, the signal generation unit 303 adjusts the vibration signal obtained by converting the sound, by using pitch shifting or the like on. Next, the signal generation unit 303 acquires a vibration pattern corresponding to a result of the recognition of the acquired image, from the vibration pattern information. Then, the signal generation unit 303 adds the acquired vibration pattern to the vibration signal obtained by converting the sound, for application of the vibration effect to the vibration signal obtained by converting the sound. Thereafter, the signal generation unit 303 outputs the vibration signal to which the vibration effect has been applied, to the communication control unit 305.

In other words, the signal generation unit 303 generates the vibration signal, on the basis of vibration measured by the vibration sensor provided at the mat and a result of the detection of the object placed on the mat. More specifically, the signal generation unit 303 generates the vibration signal, on the basis of the vibration measured by the vibration sensor and the result of the recognition of the object by the image analysis unit 304. More specifically, the signal generation unit 303 generates a basic vibration signal from the vibration measured by the vibration sensor, generates additional vibration on the basis of the result of the recognition of the object, and generates the vibration signal by adding the additional vibration to the basic vibration signal. Here, the basic vibration signal is a vibration signal generated from the sound collected by the microphone 110, and the additional signal is a vibration signal having a vibration pattern corresponding to the result of the recognition of the image.

Figure 7:
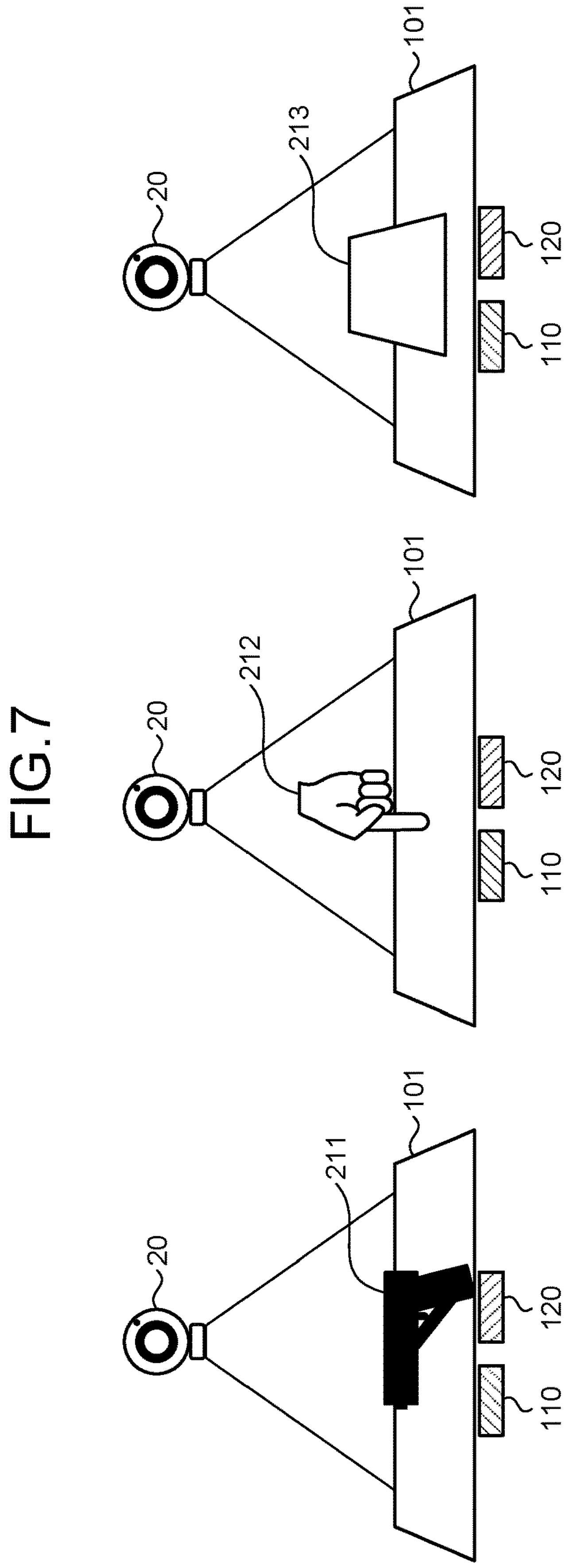
FIG. 7 is a diagram illustrating addition of a vibration effect.

FIG. 7 is a diagram illustrating addition of the vibration effect. For example, when an object 211 having the shape of a gun is arranged on the top plate 101 as seen on the left side of the drawing of FIG. 7, the signal generation unit 303 receives an input of a result of the recognition indicating "a gun" as the result of the recognition of the object 211. In this configuration, the signal generation unit 303 acquires a vibration pattern representing firing of the gun from the vibration pattern information. Furthermore, when an object 212 having the shape of a hand is arranged on the top plate 101 as seen at the center of the drawing of FIG. 7, the signal generation unit 303 receives an input of a result of the recognition indicating "a hand pressing the top plate 101" as the result of the recognition of the object 212. In this configuration, the signal generation unit 303 acquires, from the vibration pattern information, a vibration pattern indicating a tactile such as "squishy" or "tap" when the top plate 101 is pressed by a hand. Furthermore, when an object 213 having the shape of a paper sheet is arranged on the top plate 101 as seen on the right side of the drawing of FIG. 7, the signal generation unit 303 receives an input of a result of the recognition indicating "a paper sheet" as the result of the recognition of the object 213. In this configuration, the signal generation unit 303 acquires, from the vibration pattern information, a vibration pattern indicating a feeling such as "swish" or "whoosh" when the paper is handed. Then, the signal generation unit 303 adds the acquired vibration patterns to the vibration signals generated from the sound picked up by the microphone 110, as the vibration effects.

Here, in the present embodiment, when the object is outside the angle of view of the camera 20, the signal generation unit 303 has generated the signal limited to the sound collected by the microphone 110, but may perform other processing. For example, when the object is outside the angle of view of the camera 20, the signal generation unit 303 may output nothing as the vibration signal. In addition, the signal generation unit 303 may weaken the vibration signal generated from the sound collected by the microphone 110 and output the weaken vibration signal.

Furthermore, the signal generation unit 303 has generated the vibration signal directly from the sound collected by the microphone 110. However, in addition, an action or the like may be estimated from the sound to apply a vibration pattern corresponding to the estimated action to the vibration signal, as the vibration effect.

Here, in the present embodiment, the vibration pattern information held by the signal generation unit 303 in advance has been described, but the method of acquiring the vibration pattern is not limited thereto. For example, the vibration pattern information may be held by an external device such as a server arranged in a cloud so that the signal generation unit 303 may download each vibration pattern from the external device for use. In addition, the signal generation unit 303 may transmit a result of the recognition to the external device so as to receive a vibration pattern corresponding to the result of the recognition selected by the external device, from the external device, for use as the vibration effect.

Returning to FIG. 3, description will be continued. The communication control unit 305 receives an input of the vibration signal from the signal generation unit 303. Then, the communication control unit 305 transmits the vibration signal acquired, to the terminal device 31 of the person with whom the operator remotely communicates, via the network. Furthermore, the communication control unit 305 receives an input of the image captured by the camera 20, from the image analysis unit 304. Then, the communication control unit 305 transmits the image captured by the camera 20 to the terminal device 31 of the person with whom the operator remotely communicates, via the network. In other words, the communication control unit 305 transmits the vibration signal generated by the signal generation unit 303 to the other terminal device 31.

Figure 8:
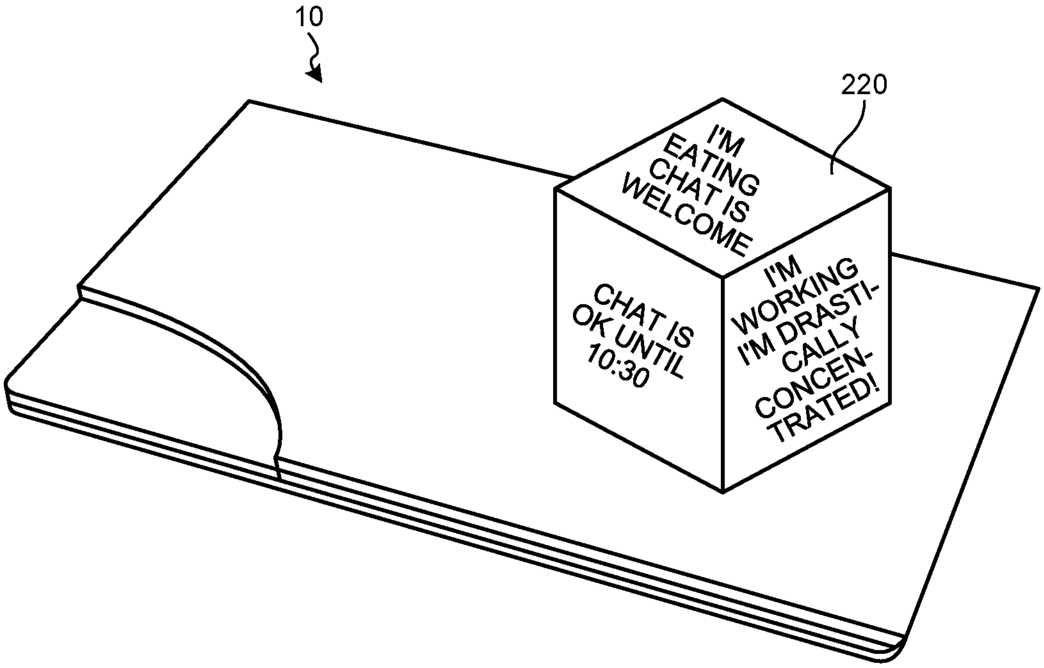
FIG. 8 is a diagram illustrating an example of intention communication using an intention indication cube.

Here, transmitting the image captured by the camera 20 to the person with whom the operator remotely communicates by the communication control unit 305 also makes it possible for the operator to communicate the intention to the person with whom the operator remotely communicates, through the image of the camera 20. FIG. 8 is a diagram illustrating an example of intention communication using an intention indication cube. The intention indication cube 220 is a cubic object that has surfaces serving as a whiteboard to write on with a pen. The intention indication cube 220 having writing on the surfaces by the operator is arranged on the top plate 101. The writing on any of the surfaces of the intention indication cube 220 that face the camera 20, is captured by the camera 20 and is transmitted as an image to the person with whom the operator remotely communicates. Therefore, the person with whom the operator remotely communicates can understand the writing on the surface of the intention indication cube 220 facing the camera 20, as the intention of the operator. For example, the operator writes the degree of interest in chatting, available time for chatting, or the busy time on each surface of the intention indication cube 220. Then, the operator selects a surface to be captured by the camera 20, according to the situation of the operator, and places the intention indication cube 220 on the top plate 101, making it easy to have a chat with the person with whom the operator remotely communicates.

Returning to FIG. 3, description will be continued. Furthermore, the communication control unit 305 receives an input of a vibration signal and a camera image transmitted from the terminal device 31 of the person with whom the operator remotely communicates, via the network. Then, the communication control unit 305 outputs the camera image transmitted from the terminal device 31 of the person with whom the operator remotely communicates, to the input/output control unit 307. Furthermore, the communication control unit 305 outputs the vibration signal to the signal output unit 302.

The signal output unit 302 receives an input of the vibration signal from the communication control unit 305. Then, the signal output unit 302 outputs the vibration signal to the vibrator 120 to vibrate the vibrator 120. In other words, the signal output unit 302 vibrates the vibration mechanism on the basis of the vibration signal transmitted from the other terminal device 31.

With this configuration, the vibrator 120 receives the vibration signal transmitted by the terminal device 31 of the person with whom the operator remotely communicates, and generates vibration to which the vibration effect is applied, according to the object placed on the top plate 101 of the person. The operator can feel the vibration generated by the vibrator 120, recognize the object placed on the top plate 101 by the person with whom the operator remotely communicates and displayed on the display device 308 also through the vibration, and obtain more information about the person with whom the operator remotely communicates.

As described above, the remote communication system 1 as the information processing system includes a plurality of terminal devices 30 as the information processing devices. The terminal device 30 includes the mat, the vibration mechanism, the signal generation unit 303, the communication control unit 305 that transmits the vibration signal generated by the signal generation unit 303 to another information processing device 31, and the signal output unit 302 that vibrates the vibration mechanism on the basis of the vibration signal transmitted from the other information processing device 31.

Vibration Signal Transmission Procedure According to First Embodiment

Figure 9:
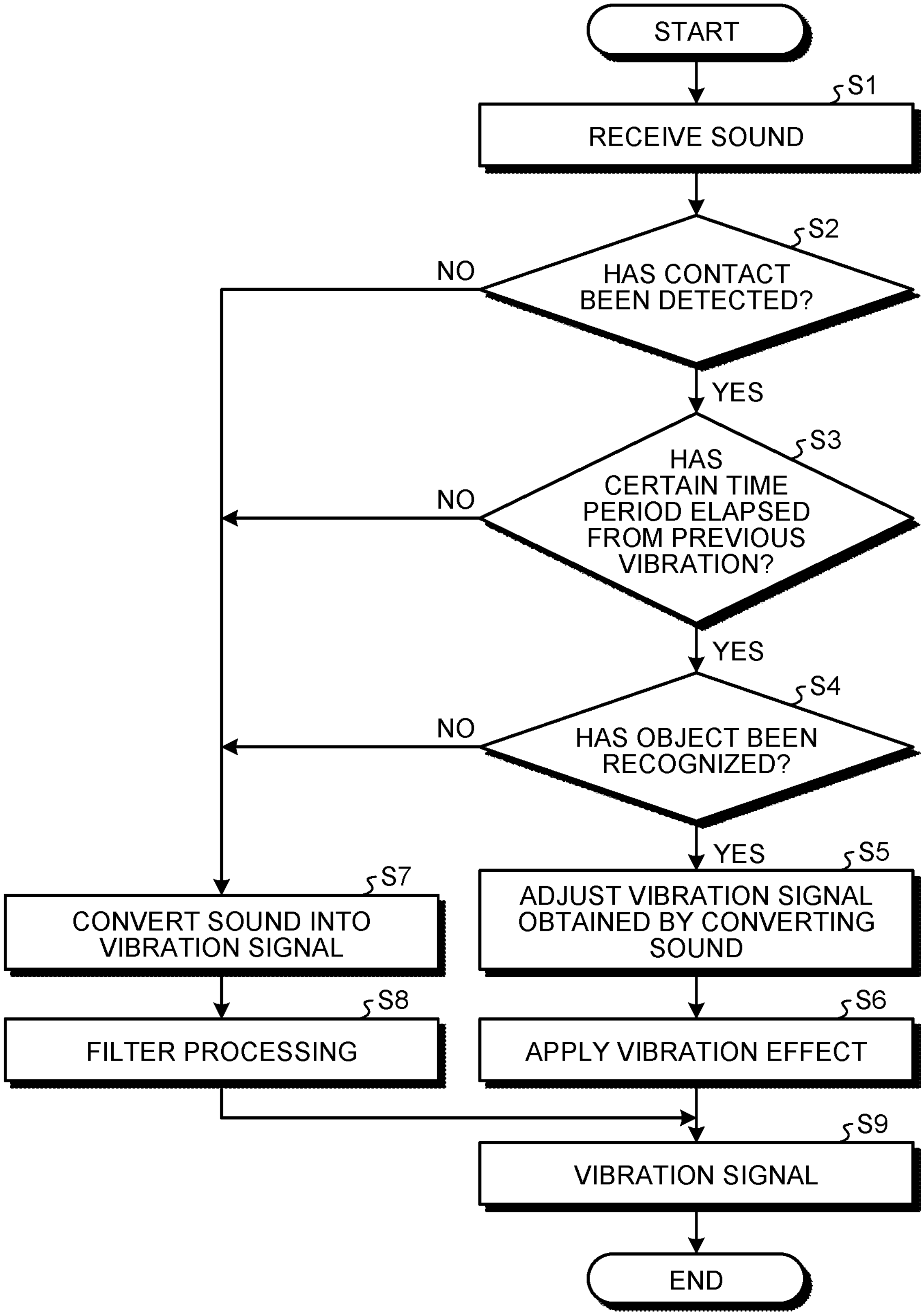
FIG. 9 is a flowchart of a transmission process for a vibration signal by the remote communication system according to the first embodiment.

FIG. 9 is a flowchart of a transmission process for the vibration signal by the remote communication system according to the first embodiment. Next, a procedure of the transmission process for the vibration signal by the remote communication system 1 according to the present embodiment will be described with reference to FIG. 9.

The contact detection unit 301 receives sound from the microphone 110 (Step S1).

When receiving the sound, the contact detection unit 301 determines whether contact of the object with the top plate 101 has been detected (Step S2).

When contact of the object is detected (Step S2: affirmative), the contact detection unit 301 determines whether the certain time period has elapsed from the previous vibration (Step S3).

When the certain time period has elapsed from the previous vibration (Step S3: affirmative), the signal generation unit 303 receives the instruction for generation of the signal to which the vibration effect is to be added, from the contact detection unit 301, together with the sound. Furthermore, the signal generation unit 303 receives an input of a result of the recognition of the image captured by the camera 20, from the image analysis unit 304. Then, the signal generation unit 303 determines whether the object placed on the top plate 101 has been recognized (Step S4).

When the object placed on the top plate 101 has been recognized (Step S4: affirmative), the signal generation unit 303 converts the sound into the vibration signal and further adjusts the vibration signal (Step S5).

Next, the signal generation unit 303 acquires a vibration pattern corresponding to the result of the recognition of the object placed on the top plate 101 by the image analysis unit 304, from the vibration pattern information. Next, the signal generation unit 303 adds the acquired vibration pattern to the vibration signal to apply the vibration effect to the vibration signal (Step S6). Then, the transmission process for the vibration signal proceeds to Step S9.

On the other hand, when no contact of the object is detected (Step S2: negative), when the certain time period has not yet elapsed from the previous vibration (Step S3: negative), or when recognition of the object is difficult or the object is outside the angle of view of the camera 20 (Step S4: negative), the signal generation unit 303 performs the following processing. The signal generation unit 303 converts the sound collected by the microphone 110 into the vibration signal (Step S7).

Next, the signal generation unit 303 passes the generate vibration signal through the low-pass filter, for filter processing (Step S8). Then, the transmission process for the vibration signal proceeds to Step S9.

The signal generation unit 303 outputs the vibration signal to the communication control unit 305. The communication control unit 305 transmits the acquired vibration signal to the terminal device 31 of the person with whom the operator remotely communicates, via the network (Step S9).

Here, in the present embodiment, the terminal device 30 has transmitted the vibration signal to the terminal device 31 of the person with whom the operator remotely communicates, but, in addition to this configuration, the sound collected by the microphone 110 may be transmitted to the terminal device 31 of the person with whom the operator remotely communicates. Furthermore, in a case where the terminal device 30 includes a sound collection device other than the microphone 110 or an image acquisition device other than the camera 20, sound or an image obtained by the sound collection device or the image acquisition device may be transmitted to the terminal device 31 of the person with whom the operator remotely communicates.

Furthermore, in the present embodiment, when the object as a source of the vibration signal is arranged on the top plate 101, the terminal device 30 generates the vibration signal and transmits the generated vibration signal to the terminal device 30. However, in the remote communication system, the vibration signal may be generated by another device.

For example, the signal generation unit 303 is arranged at an external device such as a server in a cloud. Then, the terminal device 30 transmits the sound collected by the microphone 110 or the image of the camera 20, to the external device. The signal generation unit 303 of the external device uses the sound collected by the microphone 110 or the image of the camera 20, any of which is received from the terminal device 30, generating the vibration signal to which the vibration effect corresponding to the result of the recognition is applied. Then, the external device transmits the generated vibration signal to the terminal device 31. Alternatively, the external device 30 may transmit the generated vibration signal to the terminal device 30 so that the terminal device 30 transmits the vibration signal to the terminal device 31.

In addition, for example, the vibration signal may be generated by a signal generation unit 303 of the terminal device 31 that includes a vibrator 120 vibrated by the vibration signal. In this configuration, the terminal device 30 transmits the sound collected by the microphone 110 or the image of the camera 20, to the terminal device 31. The signal generation unit 303 of the terminal device 31 uses the sound collected by the microphone 110 or the image of the camera 20, any of which is received from the terminal device 30, generating the vibration signal to which the vibration effect corresponding to the result of the recognition is applied. Then, a signal output unit 302 of the terminal device 31 outputs the generated vibration signal to vibrate the vibrator 120.

In other words, the remote communication system 1 as the information processing system includes the signal generation unit 303 that generates a vibration signal on the basis of vibration measured by the vibration sensor provided at the mat and a result of the detection of the object placed on the mat, and the signal output unit 302 that vibrates the vibration mechanism on the basis of the vibration signal generated by the signal generation unit 303.

As described above, when the object is placed on the top plate, the remote communication system according to the present embodiment adds, as the vibration effect, a vibration pattern corresponding to an image of the object placed on the top plate, to the vibration signal generated from the sound picked up by the microphone. Then, the vibration signal to which the vibration effect has been applied is transmitted to the terminal device of the person with whom the operator remotely communicates to vibrate the vibrator of a mat speaker.

In a case where sound obtained when the object is placed is simply converted into the vibration signal and transmitted to the terminal device of the person with whom the operator remotely communicates to vibrate the vibrator, providing monotonous vibration. Meanwhile, transmitting the vibration pattern according to information about the placed object and the appearance thereof makes it possible to reproduce the vibration that is difficult to express by the vibration signal based on the sound for the person with whom the operator remotely communicates, thus making the person feel more information about the arranged object. Therefore, it is possible to communicate with each other by using more information in remote communication, enabling activated communication.

MODIFIED EXAMPLES

In the first embodiment described above, the signal generation unit 303 has generated the signal limited to the sound collected by the microphone 110, upon failure in the recognition of the object by the image analysis unit 304, but it is also possible to add the vibration effect using the appearance of the object. Hereinafter, addition of the vibration effect by using the appearance of the object will be described.

Upon failure in the recognition of the object, the image analysis unit 304 recognizes the appearance of the object such as a color of the object, a size of the object relative to a reference size, or movement of the object, and notifies the appearance as appearance information. In addition, upon failure in the recognition of the object, the image analysis unit 304 notifies of the number of objects on the top plate 101 as the appearance information.

Upon failure in the recognition of the object, the signal generation unit 303 acquires a result of the recognition of the appearance of the object such as the color of the object, the size of the object relative to the reference size, or the movement of the object, from the image analysis unit 304, as the appearance information. Then, the signal generation unit 303 acquires a vibration pattern according to the acquired appearance information, and adds the vibration pattern as the vibration effect, to the vibration signal generated from the sound collected by the microphone 110.

For example, when the object has a black color, the signal generation unit 303 adds a vibration pattern representing sound, such as “thump,” representing heavy weight, as the vibration effect. Meanwhile, when the object has a white color, the signal generation unit 303 adds a vibration pattern representing sound, such as “plock,” representing light weight, as the vibration effect. Furthermore, when the object has a size larger than the reference size, the signal generation unit 303 adds the vibration pattern representing sound, such as “thump,” representing heavy weight, as the vibration effect. Meanwhile, when the object has a size smaller than the reference size, the signal generation unit 303 adds the vibration pattern representing sound, such as “plock,” representing light weight, as the vibration effect. Furthermore, when the object is rotating, the signal generation unit 303 adds a vibration pattern representing rotation such as repetitive short vibration, as the vibration effect. Meanwhile, when the object is traveling straight, the signal generation unit 303 adds a vibration pattern indicating traveling straight such as long continued vibration, as the vibration effect.

Furthermore, upon failure in the recognition of the object, the signal generation unit 303 acquires information about the number of objects on the top plate 101, from the image analysis unit 304, as the appearance information. In this configuration, the signal generation unit 303 acquires a vibration pattern corresponding to the number of the objects indicated by the acquired appearance information, and adds the vibration pattern as the vibration effect.

For example, when there is a plurality of objects, the signal generation unit 303 adds a vibration pattern representing sound, such as "clack, clack, clack, clack, clack, clack," representing putting the plurality of objects, as the vibration effect. Meanwhile, when there is one object, the signal generation unit 303 adds a vibration pattern representing sound, such as "clack," representing putting of one object, as the vibration effect.

In this way, upon failure in the recognition of the object by the image analysis unit 304, the signal generation unit 303 generates the vibration signal on the basis of the appearance of the object.

As described above, upon failure in the recognition of the object, the remote communication system according to the present modification acquires a vibration pattern from the appearance information obtained from the object and adds the vibration pattern as the vibration effect. Accordingly, even when the object cannot be recognized, vibration representing the outline of the object on the top plate can be transmitted to the person with whom the operator remotely communicates, and more information that may be an opportunity for a conversation can be given to the person. Therefore, communication can be activated.

Second Embodiment

Figure 10:
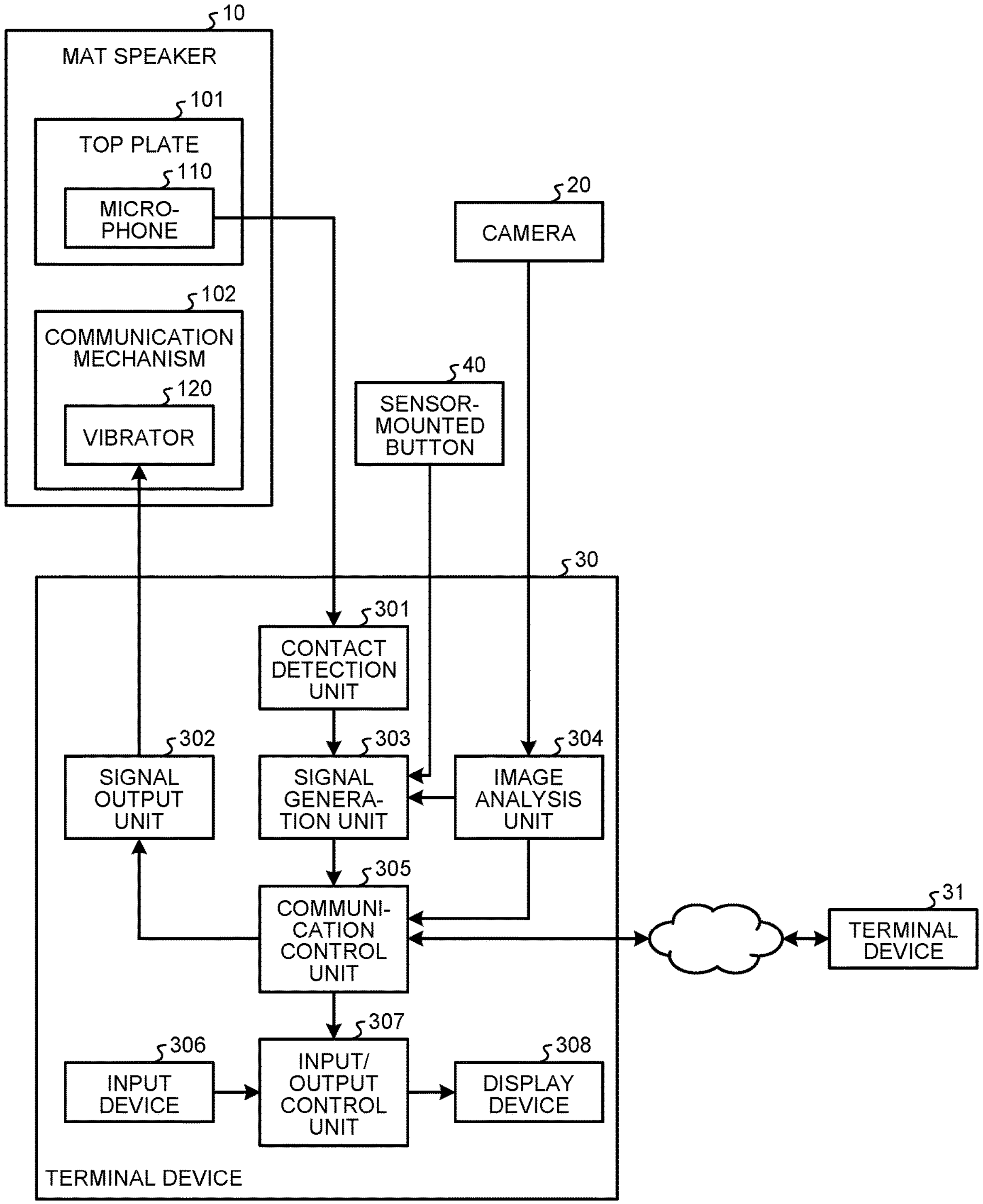
FIG. 10 is a block diagram of a remote communication system according to a second embodiment.

FIG. 10 is a block diagram of the remote communication system according to a second embodiment. The remote communication system 1 according to the present embodiment is configured to transmit a specific vibration to the person with whom the operator remotely communicates on the basis of an intention of the operator. The remote communication system 1 according to the present embodiment further includes a sensor-mounted button 40 in addition to the units of the first embodiment. In the following, descriptions of the operations of units similar to those in the first embodiment will be omitted.

Figure 11:
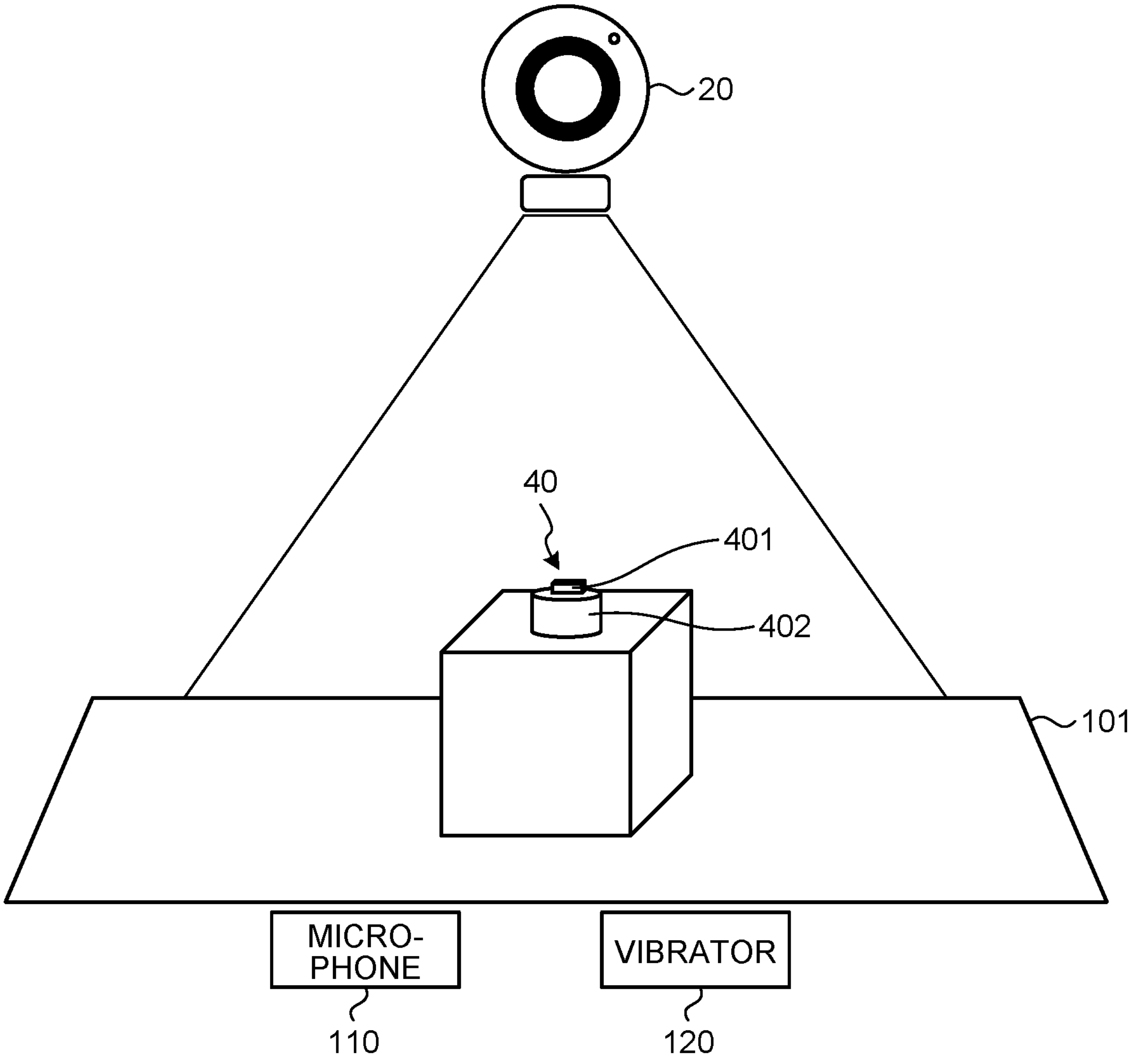
FIG. 11 is a diagram illustrating a sensor-mounted button being arranged on the top plate.

FIG. 11 is a diagram illustrating the sensor-mounted button being arranged on the top plate. For example, the sensor-mounted button 40 may be arranged on the object placed on the top plate 101, as illustrated in FIG. 11. The sensor-mounted button 40 includes an acceleration sensor 401 that is mounted on a button 402.

When the sensor-mounted button 40 is pressed by the operator, the acceleration sensor 401 detects the pressing of the sensor-mounted button 40 by the operator. Then, a signal notifying of a result of the detection by the acceleration sensor 401 is output to the signal generation unit 303.

The signal generation unit 303 receives an input of the result of the detection by the acceleration sensor 401, from the sensor-mounted button 40. Then, the signal generation unit 303 acquires a vibration pattern according to the result of the detection by the acceleration sensor 401, from the vibration pattern information. In this configuration, a predetermined vibration pattern indicating the pressing of the sensor-mounted button 40 is registered in the vibration pattern information.

Then, the signal generation unit 303 adds the vibration pattern according to the result of the detection by the acceleration sensor 401, to the vibration signal generated from the sound collected by the microphone 110, as the vibration effect. Thereafter, the signal generation unit 303 outputs the vibration signal to which the vibration effect according to the result of the detection by the acceleration sensor 401 is applied, to the communication control unit 305.

Here, the signal generation unit 303 may mute the vibration signal generated from the sound collected by the microphone 110. In this case, the signal generation unit 303 employs the vibration pattern according to the result of the detection by the acceleration sensor 401, as the vibration signal.

As described above, the remote communication system as the information processing device further includes the sensor-mounted button 40 that is a sensor-mounted mechanism that detects a predetermined action. Then, when the predetermined action is performed, the signal generation unit 303 receives a notification indicating detection of the predetermined action from the sensor-mounted mechanism, and generates a predetermined vibration signal determined in advance.

The communication control unit 305 transmits the vibration signal to which the vibration effect is applied corresponding to the result of the detection by the acceleration sensor 401, input from the signal generation unit 303, to the terminal device 31 of the person with whom the operator remotely communicates, via the network. Furthermore, the communication control unit 305 receives a vibration signal to which the vibration effect is applied corresponding to a result of the detection by the acceleration sensor 401 upon pressing the sensor-mounted button 40 by the person with whom the operator remotely communicates, via the network. Then, the communication control unit 305 outputs the vibration signal to which the vibration effect is applied corresponding to the result of the detection by the acceleration sensor 401 upon pressing the sensor-mounted button 40 by the person with whom the operator remotely communicates, to the signal output unit 302, The signal output unit 302 transmits the vibration signal to which the vibration effect is applied corresponding to the result of the detection by the acceleration sensor 401 upon pressing the sensor-mounted button 40 by the person with whom the operator remotely communicates, to the vibrator 120 and vibrates the vibrator 120. This configuration makes it possible for the operator to feel the vibration generated by pressing the sensor-mounted button 40 by the person with whom the operator remotely communicates.

As described above, in the remote communication system according to the present embodiment, it is possible to transmit the specific vibration to the person with whom the operator remotely communicates, by using the sensor or the like arranged on the button. This configuration makes it possible to convey a specific feeling to the person with whom the operator communicates, by vibration, enabling further activated communication.

Third Embodiment

Figure 12:
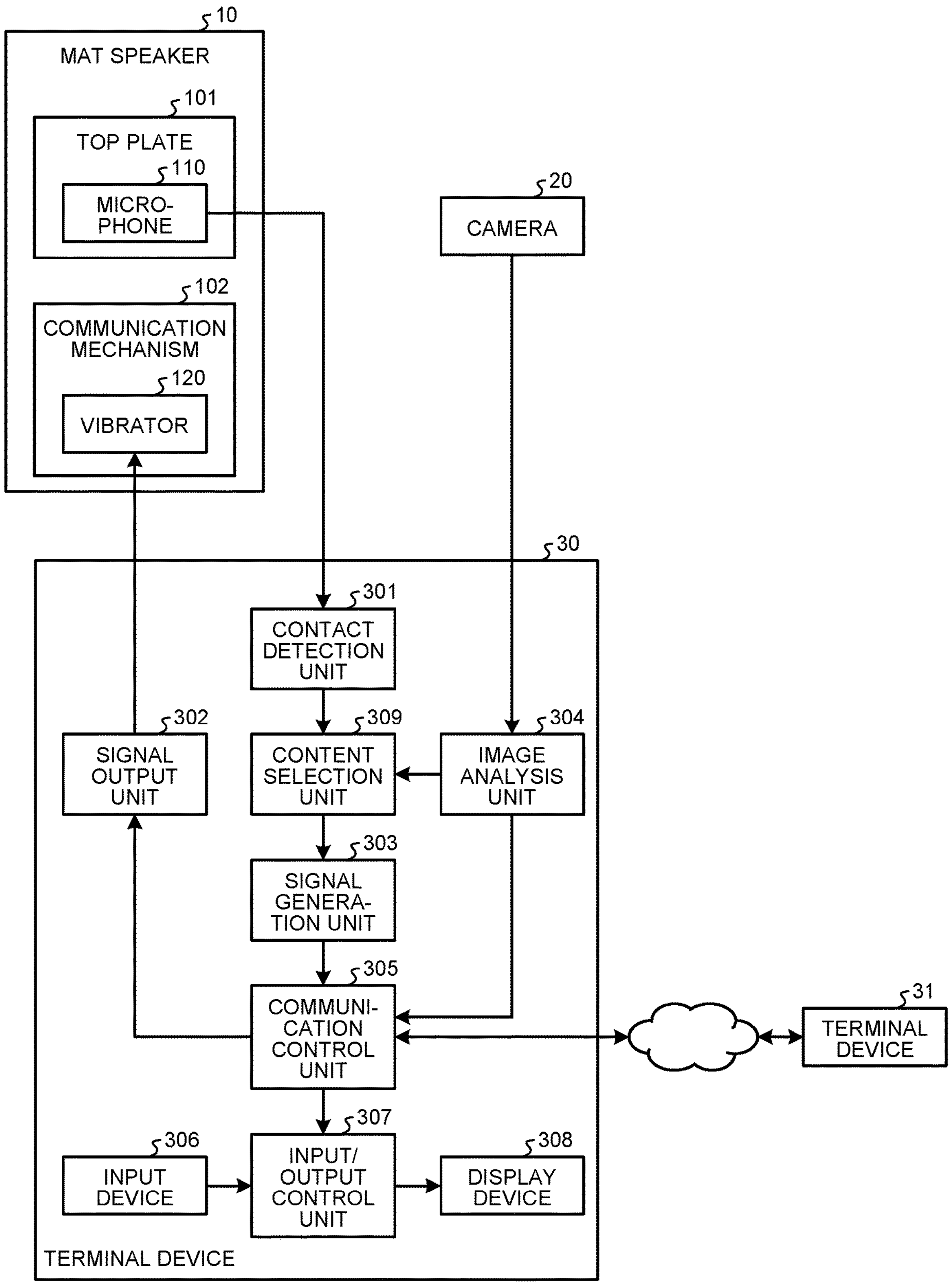
FIG. 12 is a block diagram of a remote communication system according to a third embodiment.

FIG. 12 is a block diagram of the remote communication system according to a third embodiment. The remote communication system 1 according to the present embodiment selects an object having higher priority, from among a plurality of objects as the sources from which the vibration signals are generated, and applies the vibration effect based on the selected object. The remote communication system 1 according to the present embodiment further includes a content selection unit 309 in addition to the units of the first embodiment. In the following, descriptions of the operations of units similar to those in the first embodiment will be omitted.

When a plurality of objects are placed on the top plate 101 or when work, such as writing a sentence in a notebook is performed on the top plate 101, the image analysis unit 304 recognizes a plurality of objects such as a pencil, paper sheet, a hand performing writing, and the other hand touching the top plate 101. In this case, the image analysis unit 304 outputs results of the recognition of the plurality of objects, to the content selection unit 309.

When the contact detection unit 301 detects the contact of the object with the top plate 101 after the certain time period has elapsed from the previous contact, the content selection unit 309 receives the instruction for generation of the signal to which the vibration effect is to be added, together with an input of the sound collected by the microphone 110. Next, the content selection unit 309 receives an input of a result of the recognition of the plurality of objects obtained from the image of the camera 20, from the image analysis unit 304.

Here, the content selection unit 309 preferentially selects an object having vibration easy to understand for the person with whom the operator communicates, from among the plurality of recognized objects, as a target being a source from which the vibration effect is generated. In the present embodiment, the content selection unit 309 has a priority table in which priorities for the respective objects are assigned in advance. This priority table is created on the basis of, for example, evaluations of vibrations in the past made by the operator. Then, the content selection unit 309 selects an object having the highest priority in the priority table, from among the plurality of recognized objects, as the target being a source from which the vibration effect is generated. Here, the content selection unit 309 may select a predetermined number of objects in descending order of priority. Then, the content selection unit 309 outputs the sound collected by the microphone 110 to the signal generation unit 303 together with the result of the recognition of the selected object.

For example, if the operator writes a sentence in a notebook on the top plate 101, the vibration pattern representing writing sound is easy to understand for the person with whom the operator communicates. Therefore, the content selection unit 309 selects, from among the pencil, the paper sheet, the hand performing writing, and the other hand touching the top plate 101 which are recognized by the image analysis unit 304, a result of the recognition of the hand performing writing.

In other words, when a plurality of individual objects is detected as the objects placed on the mat, the content selection unit 309 uses a priority of each of predetermined individual objects to select one or several individual objects.

In addition, the content selection unit 309 may uses a result of sound spectrum to select an object having vibration easy to understand for the person with whom the operator communicates. For example, the content selection unit 309 may perform spectrum analysis of the sound collected by the microphone 110, exclude steady sound, identify characteristic sound in time series, and select an object corresponding to the sound as the target being a source from which the vibration effect is generated. Furthermore, the content selection unit 309 may use information from other sensors such as a vibration device, an inertial measurement unit (IMU) sensor, and an acceleration sensor, in addition to the microphone 110 to select an object having vibration easy to understand for the person with whom the operator communicates.

The signal generation unit 303 receives the input of the sound collected by the microphone 110 together with the results of the recognition of the objects selected by the content selection unit 309. Then, the signal generation unit 303 generates the vibration signal from the acquired sound and adjusts the vibration signal, adds a vibration pattern corresponding to the result of the recognition of the object to the vibration signal, and generates a vibration signal to which the vibration effect has been applied. Thereafter, the signal generation unit 303 outputs the vibration signal to which the generated vibration effect has been applied, to the communication control unit 305.

Content Selection Procedure According to Third Embodiment

Figure 13:
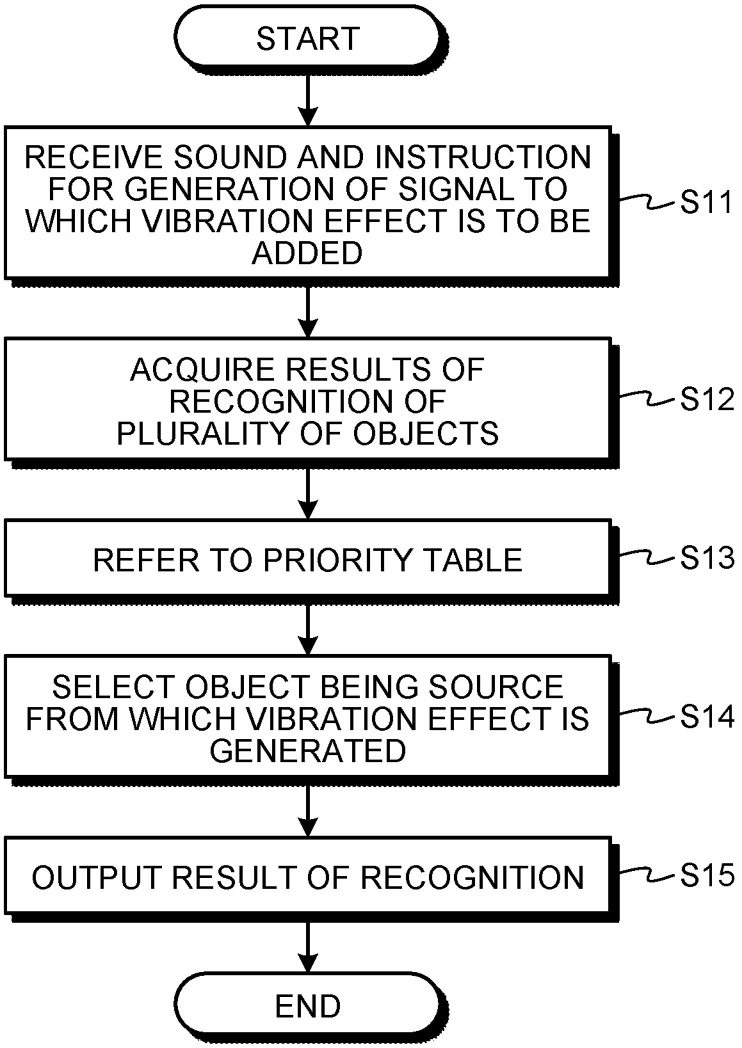
FIG. 13 is a flowchart of a content selection process by the remote communication system according to the third embodiment.

FIG. 13 is a flowchart of a content selection process by the remote communication system according to the third embodiment. Next, a procedure of the content selection process by the remote communication system 1 according to the present embodiment will be described with reference to FIG. 13.

The content selection unit 309 receives the instruction for generation of the signal to which the vibration effect is to be added, together with the input of the sound collected by the microphone 110 (Step S11).

Next, the content selection unit 309 acquires the results of the recognition of the images of the plurality of objects from the image analysis unit 304 (Step S12).

Next, the content selection unit 309 refers to the priority table (Step S13).

The content selection unit 309 selects an object having the highest priority indicated in the priority table, from among the plurality of objects whose results of the recognition have been acquired, as an object being a source from which the vibration effect is generated (Step S14).

Thereafter, the content selection unit 309 outputs the result of the recognition of the selected object together with the sound, to the signal generation unit 303 (Step S15).

As described above, when the plurality of objects is recognized, the remote communication system according to the present embodiment preferentially selects an object determined to have a vibration pattern easy to understand for the person with whom the operator communicates, from among the objects, as the target being the source from which the vibration effect is generated. This configuration makes it easy for the person with whom the operator remotely communicates to further understand a state on the side of the operator, enabling activated communication.

Fourth Embodiment

Figure 14:
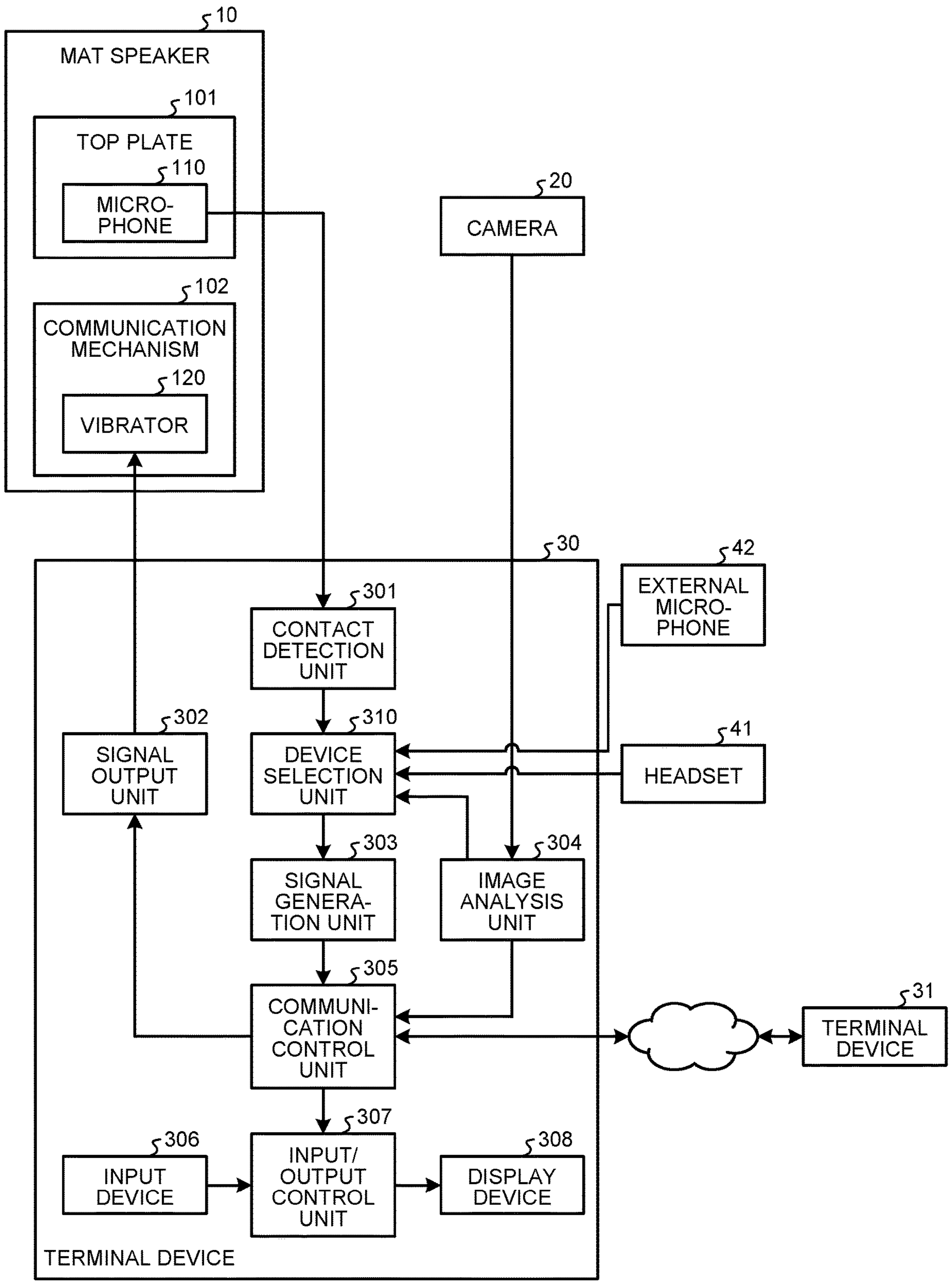
FIG. 14 is a block diagram of a remote communication system according to a fourth embodiment.

FIG. 14 is a block diagram of the remote communication system according to a fourth embodiment. The remote communication system 1 according to the present embodiment selects a device configured to acquire maximum information about vibration to be transmitted to acquire a vibration pattern on the basis of information obtained from the selected device. The remote communication system 1 according to the present embodiment further includes a device selection unit 310 in addition to the units of the first embodiment. In the following, descriptions of the operations of units similar to those in the first embodiment will be omitted.

For example, when the operator eats an apple placed on the top plate 101, sound obtained by a microphone at the mouth of the operator more accurately represents eating of the apple than the sound obtained by a device being the microphone 110 provided at the top plate 101. In this way, it is preferable to select a device by which a vibration pattern desired to be transmitted can be easily obtained and generate the vibration pattern by using information from the device. In the present embodiment, a headset 41 worn by the operator and another external microphone 42 are arranged. In other words, the remote communication system 1 as the information processing device includes a plurality of information acquisition devices such as the camera 20, the headset 41, and the external microphone 42.

When the contact detection unit 301 detects contact of an object with the top plate 101 after the certain time period has elapsed from the previous contact, the device selection unit 310 receives the instruction for generation of the signal to which the vibration effect is to be added, together with an input of the sound collected by the microphone 110. Next, the device selection unit 310 receives an input of a result of the recognition of the image from the image analysis unit 304. Furthermore, the device selection unit 310 receives inputs of sounds from the headset 41 and the external microphone 42.

Next, the device selection unit 310 determines whether content to be transmitted is included in the sounds obtained from the microphone 110, the headset 41, and the external microphone 42. For example, when a sound is heard several seconds later after the apple arranged on the top plate 101 is picked up, the device selection unit 310 determines that there is the content to be transmitted. When the content to be transmitted is not included, the device selection unit 310 outputs, to the signal generation unit 303, the instruction for generation of the signal to which the vibration effect is to be added, together with the sound from the microphone 110 and the result of the recognition of the image.

On the other hand, when the content to be transmitted is included, the device selection unit 310 selects a device having a higher sound pressure. For example, in the case of eating sound, the device selection unit 310 selects the headset 41 because the headset 41 closer to the mouth of the operator has the highest sound pressure. Here, in the present embodiment, selection of the device has been performed on the basis of the sound pressure of each device, but the device selection unit 310 may select a device configured to acquire a characteristic frequency band of content selected. Furthermore, the device selection unit 310 may select a plurality of devices. In this way, the device selection unit 310 selects one or a plurality of specific information acquisition devices from among the plurality of information acquisition devices.

Then, the device selection unit 310 outputs the sound from the microphone 110, the sound collected by the headset 41, and the result of the recognition of the image, to the signal generation unit 303. Here, in the present embodiment, the device selection unit 310 has selected the device for obtaining the content being a source from which the vibration pattern is generated, from among the sound collection devices, but, in addition, a plurality of image acquisition devices may be provided, in addition to the camera 20, so as to select a device configured to obtain the maximum information about the content to be transmitted, from among the plurality of image acquisition devices.

The signal generation unit 303 acquires, from the device selection unit 310, inputs of the sound from the microphone 110, the sound collected by the headset 41, and the result of the recognition of the image. Then, the signal generation unit 303 generates the vibration signal on the basis of the sound from the microphone 110 and adjust the vibration signal. Furthermore, a vibration pattern corresponding to the sound collected by headset 41 and a vibration pattern corresponding to the result of the recognition of the image are acquired. Furthermore, the signal generation unit 303 adds the vibration pattern corresponding to the sound collected by the headset 41 and the vibration pattern corresponding to the result of the recognition of the image, to the vibration signal, as the vibration effect. In other words, the signal generation unit 303 generates the vibration signal on the basis of acquisition information obtained from the specific information acquisition devices selected by the device selection unit 310.

Signal Generation Procedure According to Fourth Embodiment

Figure 15:
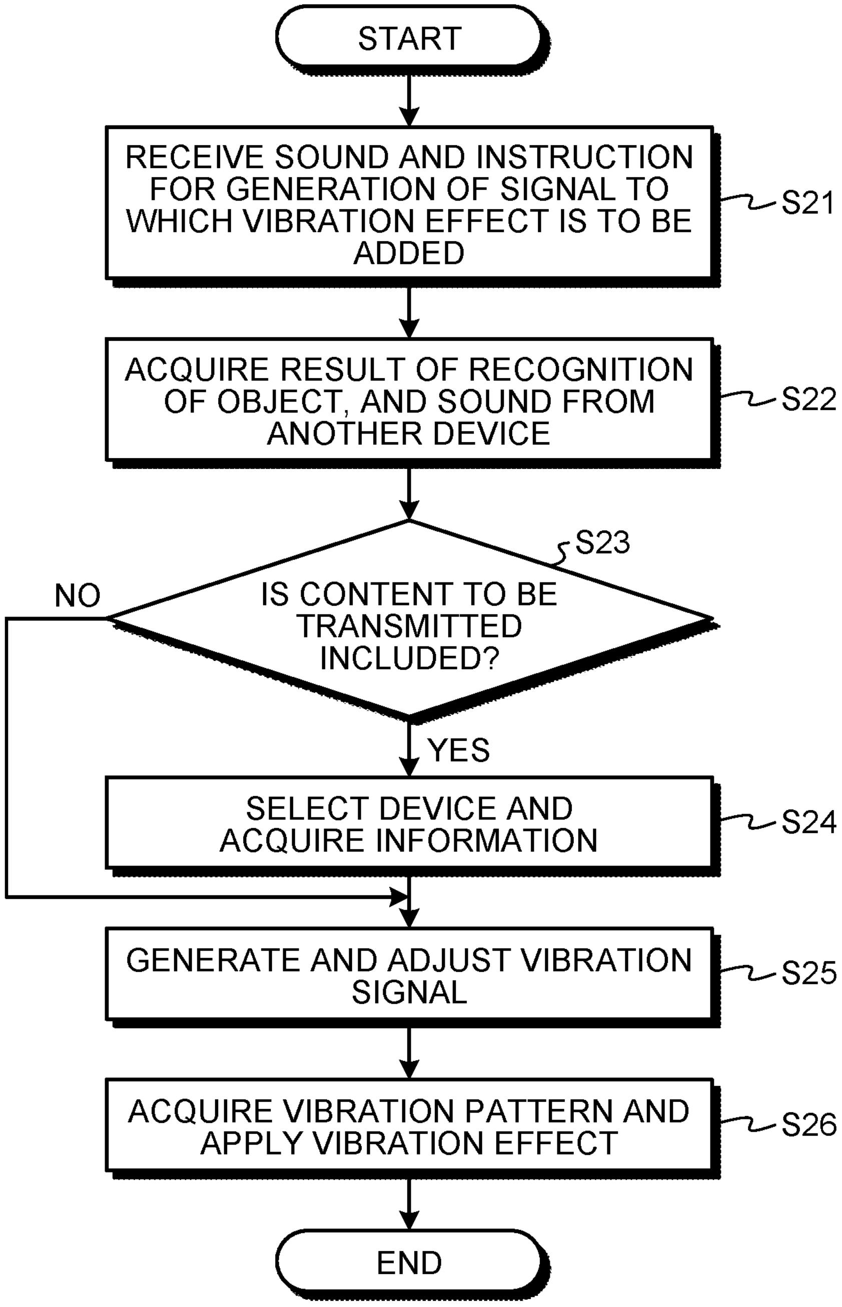
FIG. 15 is a flowchart of a vibration signal generation process including device selection by the remote communication system according to the fourth embodiment.

FIG. 15 is a flowchart of a vibration signal generation process including device selection by the remote communication system according to the fourth embodiment. Next, a procedure of the vibration signal generation process by the remote communication system 1 according to the present embodiment will be described with reference to FIG. 15.

The device selection unit 310 receives the instruction for generation of the signal to which the vibration effect is to be added, together with the input of the sound collected by the microphone 110 (Step S21).

Next, the device selection unit 310 acquires the result of the recognition of the image, and the sounds from the headset 41 and the external microphone 42 (Step S22).

Next, the device selection unit 310 determines whether the content to be transmitted is included (Step S23). When the content to be transmitted is not included (Step S23: negative), the device selection unit 310 outputs, to the signal generation unit 303, the instruction for generation of the signal to which the vibration effect is to be added, together with the sound collected by the microphone 110 and the result of the recognition of the image. Thereafter, the vibration signal generation process proceeds to Step S25.

On the other hand, when the content to be transmitted is included (Step S23: affirmative), the device selection unit 23 selects a device having the highest sound pressure, from the microphone 110, the headset 41, and the external microphone 42. Then, the device selection unit 23 acquires information collected by the selected device (Step S24). Then, the device selection unit 310 outputs, to the signal generation unit 303, the instruction for generation of the signal to which the vibration effect is to be added, together with the sound from the microphone 110, the result of the recognition of the image, and the information collected by the selected device.

The signal generation unit 303 generates the vibration signal on the basis of the sound from the microphone 110 and adjust the vibration signal (Step S25).

Next, the signal generation unit 303 acquires a vibration pattern corresponding to the result of the recognition of the image. Furthermore, when receiving the sound from the device selected by the device selection unit 310, the signal generation unit 303 acquires a vibration pattern corresponding to the sound. Then, the signal generation unit 303 adds the acquired vibration pattern to the vibration signal, as the vibration effect (Step S26).

As described above, the remote communication system according to the present embodiment selects a device configured to obtain the maximum information about the content to be transmitted, applying a vibration pattern corresponding to the information obtained from the device, as the vibration effect. This configuration makes it possible to transmit vibration more appropriately representing the action of the operator or the object, to the person with whom the operator communicates, enabling activated communication.

Fifth Embodiment

The remote communication system 1 according to the present embodiment is illustrated in the block diagram of FIG. 3. The remote communication system 1 according to the present embodiment adjusts vibrations to be transmitted and received, according to a state of the top plate 101 and a surrounding environment. In the following, descriptions of the operations of units similar to those in the first embodiment will be omitted.

It is considered that the operator may place an object that may cause trouble due to vibration or an object that hinders vibration on the top plate 101. For example, an unstable object, a living thing, an object absorbing vibration, or the like can be considered. In addition, it is considered that the operator may have a trouble if the top plate 101 is vibrated. For example, it is considered that the operator is sleeping at the top plate 101, the operator is performing work that may have trouble if vibration is generated on the top plate 101, or the operator is working at a common desk with another person. Furthermore, continuous transmission of the vibration signal generated from the sound collected by the microphone 120 may cause excessive vibration of the vibrator 120. In these cases, it is preferable to suppress vibration by not vibrating the top plate 101, reducing the vibration, or the like.

Therefore, the image analysis unit 304 according to the present embodiment grasps the object that may cause trouble due to vibration, the object that hinders vibration, or a state in which vibration may cause trouble, in advance by machine learning or the like. Then, when it is determined that the object that may cause trouble due to vibration or the object that hinders vibration is positioned on the top plate 101, as a result of recognition of an image captured by the camera 20, the image analysis unit 304 instructs the signal output unit 302 to suppress the vibration. Furthermore, the image analysis unit 304 instructs the signal output unit 302 to suppress the vibration similarly in a state in which the vibration may cause trouble.

Here, in the present embodiment, the image analysis unit 304 has suppressed the vibration by using the result of the recognition of the image of the camera 20, but a trigger to suppress the vibration is not limited thereto. For example, the object that may cause trouble due to vibration, the object that hinders vibration, or the state in which vibration may cause trouble may be determined on the basis of information from the microphone 100, a weight sensor additionally arranged, or the like, arranged on the top plate 101. Furthermore, the image analysis unit 304 may use information from another camera or another microphone arranged in a room, a vibration sensor, an IMU sensor, an acceleration sensor, an application activated on the terminal device 30, and the like to determine a state in which trouble may be caused due to vibration.

When the vibrator 120 is vibrated by the signal from the terminal device 31 of the person with whom the operator remotely communicates, the signal output unit 302 dampens or stops the vibration to suppress the vibration.

Here, in the present embodiment, the vibration is suppressed in the terminal device 30 on the reception side, but the vibration may be suppressed in the terminal device 30 on the transmission side. For example, a request for vibration suppression may be notified from the reception side of the vibration signal whose vibration is desired to be suppressed, to the transmission side of the vibration signal so that the signal generation unit 303 suppresses the signal upon generating the vibration signal in the terminal device 30 on the transmission side.

Furthermore, when the sound collected by the microphone 110 continues for a certain specific time period, the signal generation unit 303 stops generation of the vibration signal. In addition, when recognition of an image acquired from the other camera capturing an image in the room is performed and it is determined that the sound is continued for a predetermined period or more on the basis of a result of the recognition of the image, the signal generation unit 303 may stop generation of the vibration signal. For example, when a vacuum cleaner is recognized as a result of the recognition of the image, the signal generation unit 303 determines that the sound of using the vacuum cleaner continues for a predetermined period or more, and stops generation of the vibration signal based on the sound of the vacuum cleaner.

Furthermore, after removing a steady sound or the like from the sound collected by the microphone 110 by using sound source separation technology to extract a sound to be transmitted, the signal generation unit 303 may use the extracted sound to generate the vibration signal.

As described above, the remote communication system according to the present embodiment adjusts the vibration to be received and the vibration to be transmitted according to the object on the top plate, the surrounding environment, or the like. This configuration makes it possible to suppress transmission of excessive vibration or transmission and reception of the vibrations at inappropriate timing, enabling reduction of discomfort in remote communication and smooth communication.

Sixth Embodiment

Figure 16:
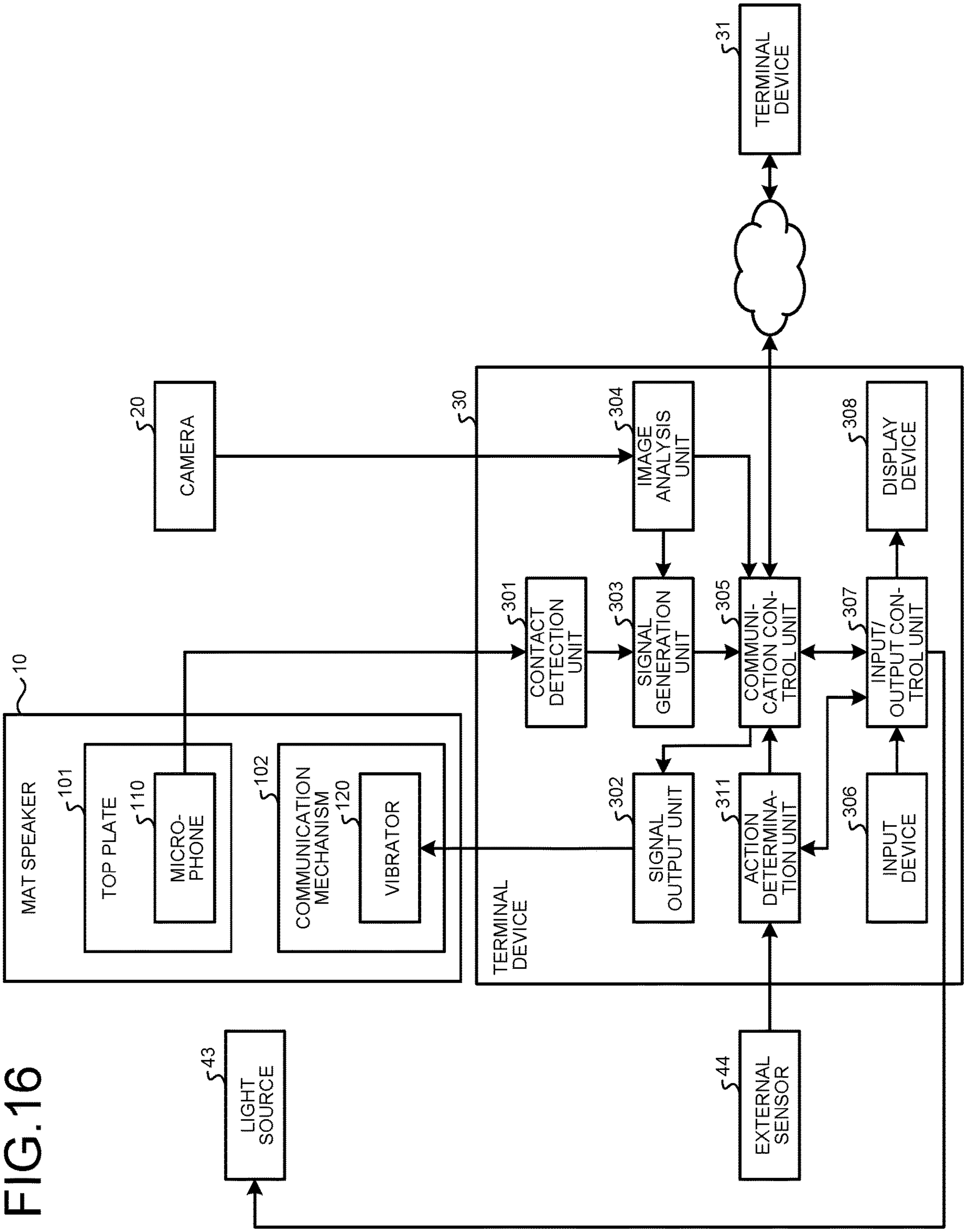
FIG. 16 is a block diagram of a remote communication system according to a sixth embodiment.

FIG. 16 is a block diagram of the remote communication system according to a sixth embodiment. The remote communication system 1 according to the present embodiment automatically determines a desire to talk from the action of the operator, and presents the desire to talk, to the person with whom the operator remotely communicates. In addition, the desire to talk is presented to the person with whom the operator remotely communicates, according to an input from the operator. The terminal device 30 according to the present embodiment further includes an action determination unit 311 in addition to the units of the first embodiment. In the following, descriptions of the operations of units similar to those in the first embodiment will be omitted.

The action determination unit 311 acquires operation information about an operation performed by the operator by using the input device 306, via the input/output control unit 307. Examples of the operations performed by the operator by using the input device 306 include closing a working file, completing e-mail transmission, finish of a remote meeting, cancellation of a meeting schedule, surfing the Internet, performing time-consuming work, and not typing.

In addition, the action determination unit 311 is connected to an external sensor 43 and acquires information about the action of the operator acquired by the external sensor 43. The external sensor 43 is, for example, another camera that captures an image of the operator. Examples of the actions of the operator include, for example, looking at the mat speaker 10, sitting on a chair for one hour or more, sitting on the chair, having a snack or drinking, and having a memo pad but writing nothing. For example, the action determination unit 311 performs image recognition by using the image of the camera, recognizes the action of the operator, and identifies the recognized action of the operator.

Here, the action determination unit 311 has in advance a weight indicating each operation with the input device 306 by the operator and the desire to talk for each action of the operator. Here, it is assumed that a higher weight indicates a higher desire to talk. For example, when the user is surfing the Internet, the weight is increased, and when the user is performing time-consuming work, the weight is reduced. Then, the action determination unit 311 adds up the weights of operations using the input device 306 by the operator until that time and the actions of the operator and calculates a current weight of the desire to talk of the operator.

Here, the action determination unit 311 holds in advance a reference value for the desire to talk to determine that the desire to talk is higher when the weight is equal to or larger than the reference value and is lower when the weight is less than the reference value. Next, the action determination unit 311 compares the calculated current weight of the desire to talk and the reference value.

When the weight of the current desire to talk is equal to or larger than the reference value, the action determination unit 311 determines that the desire to talk is high. Then, the action determination unit 311 instructs the communication control unit 305 and the input/output control unit 307 to perform processing of presenting the desire to talk, to the person with whom the operator remotely communicates. On the other hand, when the weight of the current desire to talk is less than the reference value, the action determination unit 311 determines that the desire to talk is low, and does not notify of the desire to talk.

The action determination unit 311 may clearly present the desire to talk, to the person with whom the operator remotely communicates. For example, the action determination unit 311 instructs the communication control unit 305 to display an icon indicating that it is OK to talk, on a screen for the camera 20 of the terminal device 30, displayed on the terminal device 30, or to output a pop-up sound from the terminal device 31 of the person with whom the operator remotely communicates. In addition, the action determination unit 311 instructs the communication control unit 305 to perform display in which the brightness of the screen for the camera 20 of the terminal device 30, displayed on the terminal device 30, changes by blinking.

Furthermore, the action determination unit 311 may gently communicate the desire to talk, to the person with whom the operator remotely communicates. For example, the action determination unit 311 causes the communication control unit 305 and the input/output control unit 307 to display a common topic between the operator who desires to have a talk and the person with whom the operator remotely communicates. Furthermore, the action determination unit 311 instructs the communication control unit 305 to gradually increase a sound volume to be transmitted to the terminal device 30 of the person with whom the operator remotely communicates. Furthermore, the action determination unit 311 notifies the signal generation unit 303 of an instruction for gradually increasing the vibration to be transmitted to the terminal device 30 of the person with whom the operator remotely communicates. Furthermore, the action determination unit 311 instructs the communication control unit 305 to gradually increase the angle of view of the image of the camera 20 of the terminal device 30, for the terminal device 31 of the person with whom the operator remotely communicates. Furthermore, the action determination unit 311 instructs the signal generation unit 303 to generate a signal for vibrating an object on the mat speaker 10 to move, for the terminal device 31 of the person with whom the operator remotely communicates. Furthermore, the action determination unit 311 may cause the communication control unit 305 to transmit an image of a swaying tree in the image of the camera 20 of the terminal device 30, to the terminal device 31 of the person with whom the operator remotely communicates, and may instruct the signal generation unit 303 to generate the vibration signal that vibrates the vibrator 120 in accordance with the swaying of the tree. Furthermore, the action determination unit 311 may cause the communication control unit 305 to transmit a command to move a predetermined mascot in the image of the camera 20 of the terminal device 30, to the terminal device 31 of the person with whom the operator remotely communicates, and may instruct the signal generation unit 303 to generate the vibration signal for vibration according to the movement of the mascot.

In this way, the action determination unit 311 determines the operation by the operator or the action of the operator, and causes the signal generation unit 303 to transmit a predetermined signal to the other terminal device 31 according to a result of the determination and to generate the vibration signal based on the result of the determination.

In response to the instruction from the action determination unit 311, the signal generation unit 303 generates the vibration signal corresponding to the result of the determination, according to the result of the determination of the operation or action of the operator by the action determination unit 311.

The input/output control unit 307 receives the instruction for presenting the desire to talk from the operator, from the input device 306. Then, the input/output control unit 307 presents the desire to talk, to the person with whom the operator remotely communicates, by using another visual effect or light.

Figure 17:
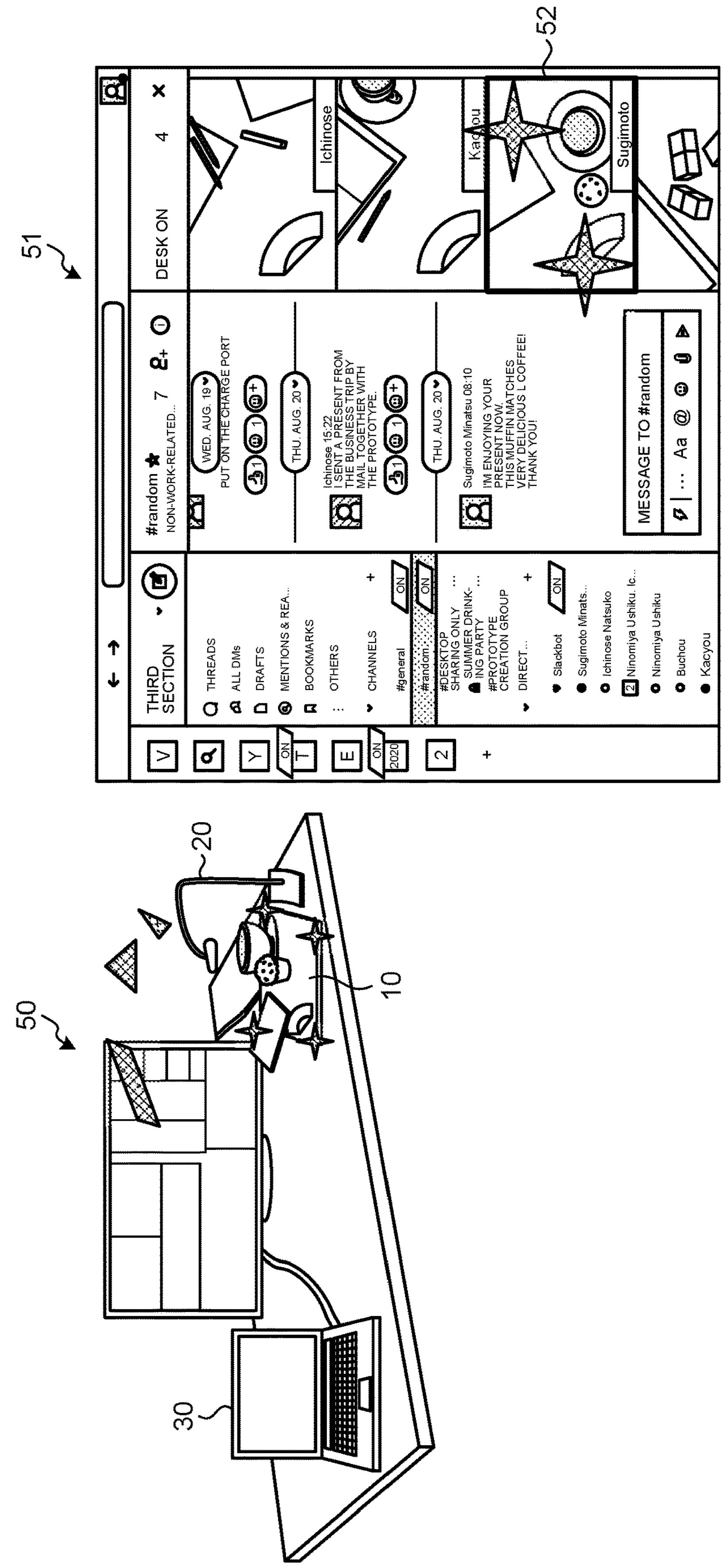
FIG. 17 is a diagram of a mat speaker on a transmission side with the periphery thereof illuminated.
Figure 18:
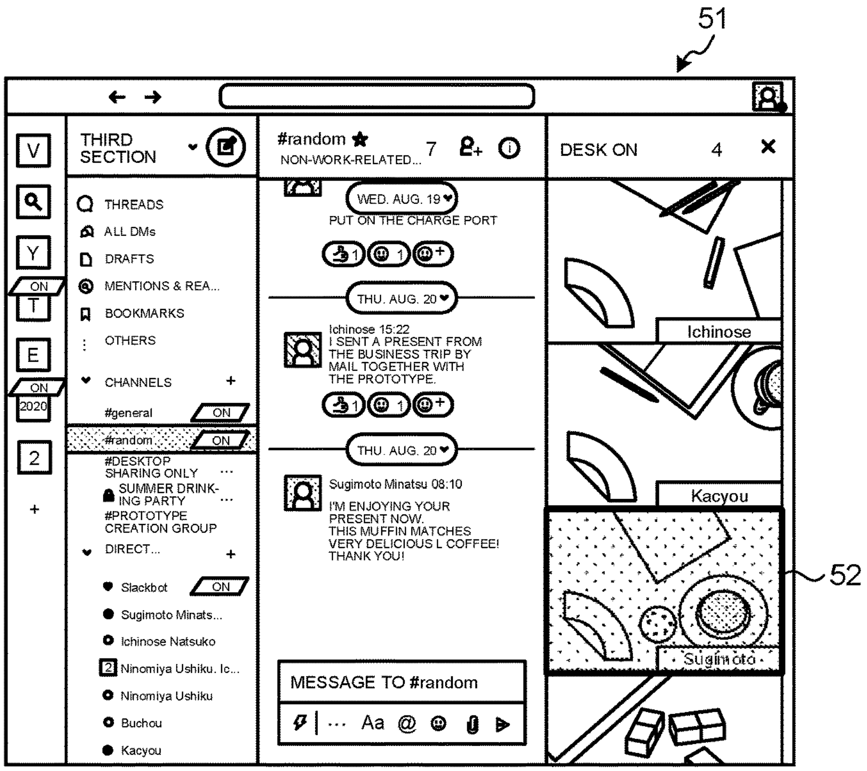
FIG. 18 is a diagram of the mat speaker on the transmission side with lighting changed.
Figure 19:
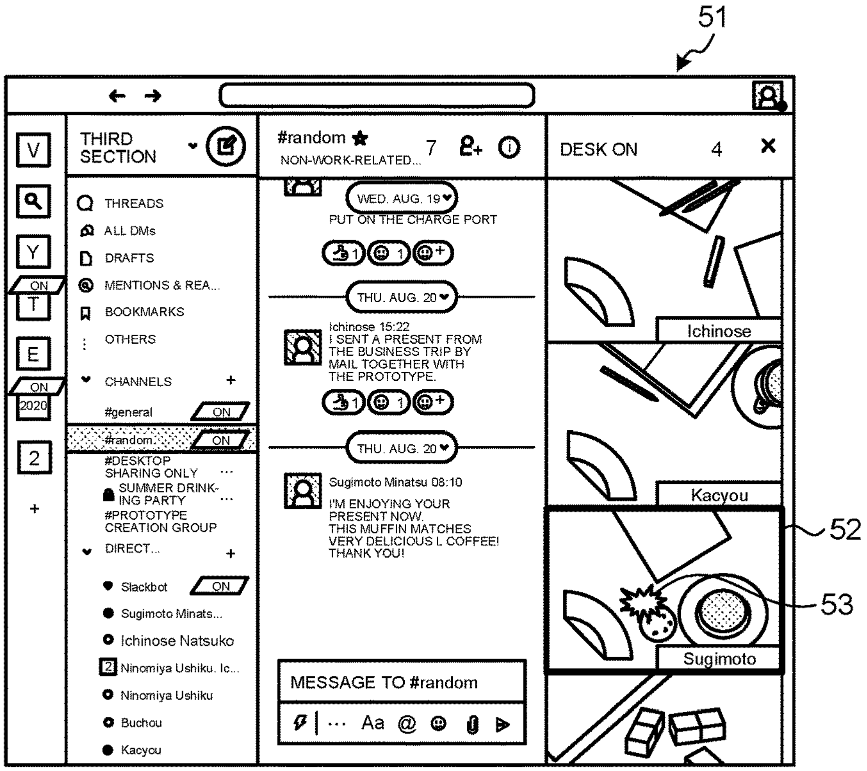
FIG. 19 is a diagram of the mat speaker on the transmission side displayed with a specific position thereof intensified.

For example, a light source 43 is arranged in the vicinity of the mat speaker 10. Examples of the light source 43 include, for example, an LED arranged around the mat speaker 10, lighting for illuminating the entire mat speaker 10, a spotlight for illuminating the mat speaker 10, a multi-light source for illuminating the mat speaker 10 in a divided manner, and the like. FIG. 17 is a diagram of the mat speaker on a transmission side with the periphery illuminated. Furthermore, FIG. 18 is a diagram of the mat speaker on the transmission side with lighting changed. Furthermore, FIG. 19 is a diagram of the mat speaker on the transmission side displayed with a specific position thereof intensified.

The operator uses the input device 306 to input an instruction for blinking the light source 43 around the mat speaker 10. The input/output control unit 307 receives the instruction from the operator, and blinks the light source 43 around the mat speaker 10 of the terminal device 30 as illustrated in a state 50 of FIG. 17. This configuration blinks an image 52 of the camera 20 of the terminal device 30, on a screen 51 of the person with whom the operator remotely communicates, displayed on the terminal device 31 of the person. This configuration makes it possible to aggressively communicate the desire to talk.

In addition, the operator uses the input device 306 to input an instruction for setting, to the mood of the operator, the brightness or hue of lighting of the light source 43 that illuminates the mat speaker 10. The input/output control unit 307 receiveds the instruction from the operator, and changes the brightness or hue of lighting of the light source 43 that illuminates the mat speaker 10. As illustrated in FIG. 18, this configuration changes the brightness and hue of the image 52 of the camera 20 of the terminal device 30, on the screen 51 of the person with whom the operator remotely communicates, displayed on the terminal device 31 of the person. This configuration makes it possible to gently communicate the desire to talk.

In addition, the operator uses the input device 306 to input an instruction for putting a spotlight of the light source 43 on the specific position of the mat speaker 10. The input/output control unit 307 receives the instruction from the operator, and controls the light source 43 to illuminate the specific position of the mat speaker 10 with the spotlight. As illustrated in FIG. 19, this configuration illuminates, with the spotlight, a specific position in the image 52 of the camera 20 of the terminal device 30, on the screen 51 of the person with whom the operator remotely communicates, displayed on the terminal device 31 of the person. This configuration makes it possible to communicate what it refers to to the person with whom the operator communicates. Here, the operator can point to the specific position of the mat speaker 10 with his/her finger by reaching his/her hand, but in such a case, regions other than the specific position is hidden by his/her arm. In contrast, illuminating the specific position with the spotlight makes it possible show the specific position without hiding other regions.

Figure 20:
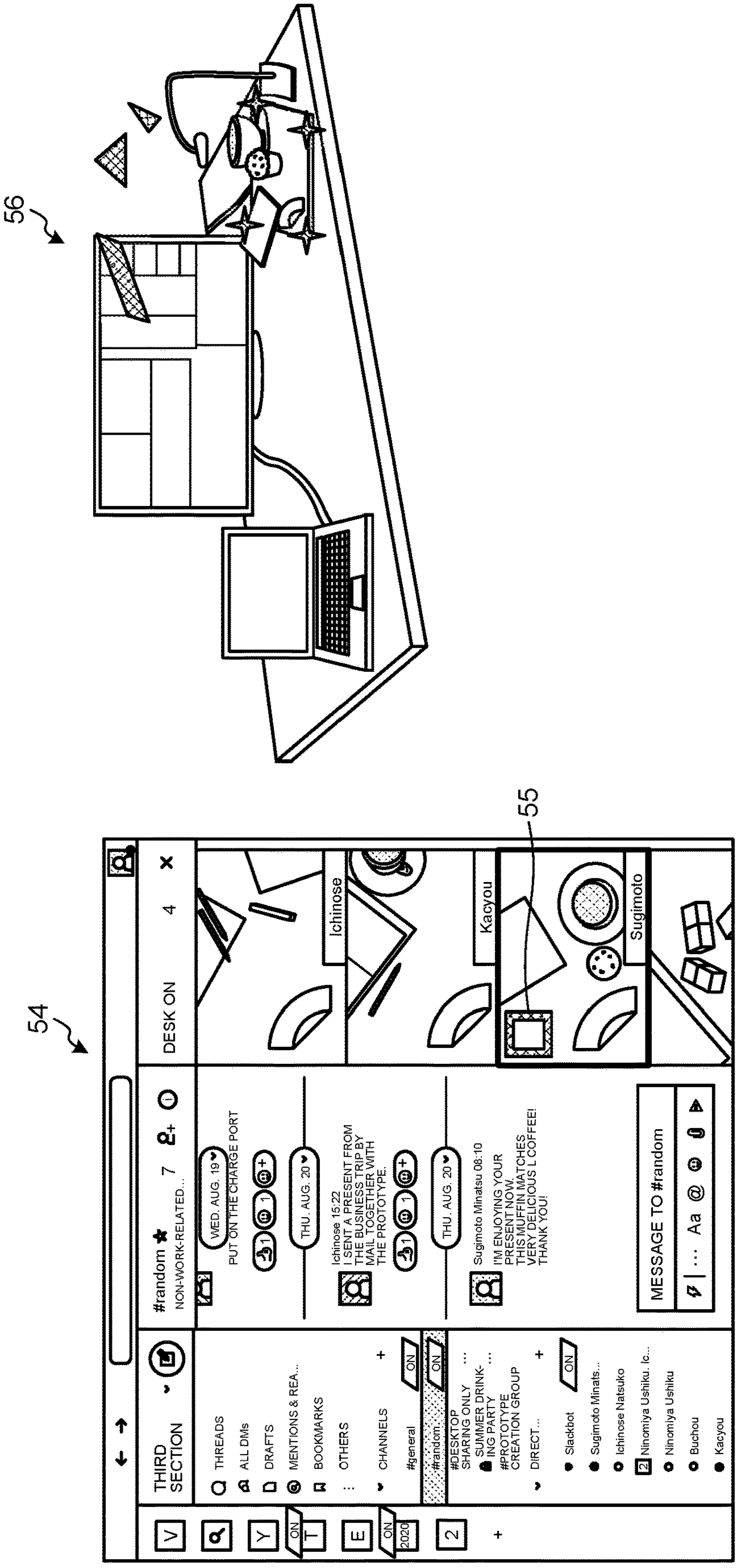
FIG. 20 is a diagram of a mat speaker of a person with whom an operator communicates, with the periphery thereof illuminated.
Figure 21:
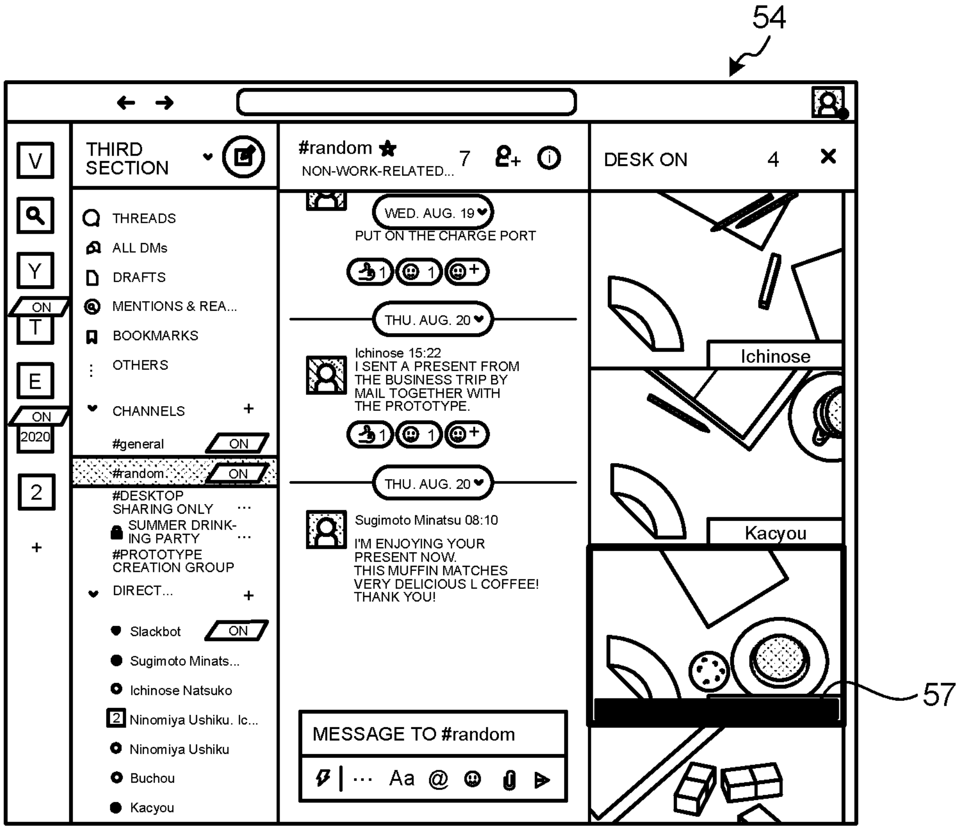
FIG. 21 is a diagram of the mat speaker of the person with whom the operator communicates, with lighting changed.

Furthermore, the light source 43 of the person with whom the operator remotely communicates may be changed by the input from the operator. FIG. 20 is a diagram of a mat speaker of the person with whom the operator communicates, with the periphery thereof illuminated. Furthermore, FIG. 21 is a diagram of the mat speaker of the person with whom the operator communicates, with lighting changed. Furthermore, FIG. 22 is a diagram of the mat speaker of the person with whom the operator communicates, with a specific position thereof intensified.

The operator uses the input device 306 to select an LED icon 55 in an image of a camera 20 of the person with whom the operator remotely communicates, on a screen 54 displayed on the display device 308 of the terminal device 30 illustrated in FIG. 20, inputting an instruction for brightening a light source 43 around the mat speaker 10 of the person. In response to the instruction from the operator, the input/output control unit 307 transmits the instruction for blinking the light source 43 around the mat speaker 10 of the person with whom the operator remotely communicates, to the terminal device 31 of the person via the communication control unit 305. As illustrated in a state 56 of FIG. 20, this configuration blinks the light source 43 around the mat speaker 10 of the person with whom the operator remotely communicates. This configuration makes it possible to aggressively communicate the desire to talk.

Furthermore, the operator uses the input device 306 to operate a lighting slide bar 57 in the image of the camera 20 of the person with whom the operator remotely communicates, on the screen 54 displayed on the display device 308 of the terminal device 30 illustrated in FIG. 21. In response to an instruction from the operator, the input/output control unit 307 transmits an instruction for changing the brightness of lighting of the light source 43 around the mat speaker 10 of the person with whom the operator remotely communicates, to the terminal device 31 of the person via the communication control unit 305. This configuration changes the brightness of the illumination lighting the mat speaker 10 of the person with whom the operator remotely communicates. This configuration makes it possible to gently communicate the desire to talk.

Figure 22:
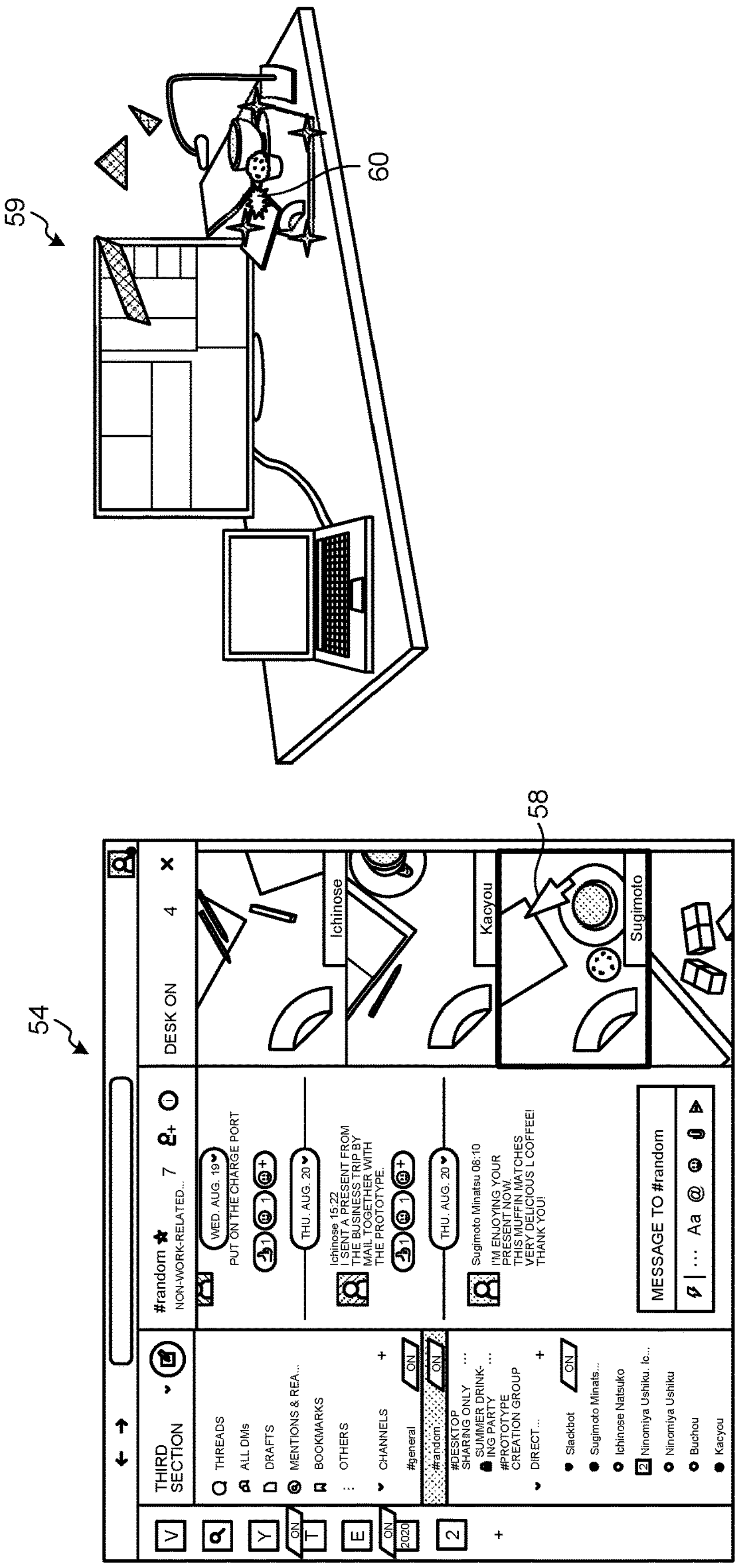
FIG. 22 is a diagram of the mat speaker of the person with whom the operator communicates, with a specific position thereof intensified.

In addition, as illustrated in FIG. 22, the operator uses the input device 306 to specify a specific position in the image of the camera 20 of the person with whom the operator remotely communicates, on the screen 54 displayed on the display device 308 of the terminal device 30 with a pointer 58. In response to an instruction from the operator, the input/output control unit 307 transmits an instruction for controlling the light source 43 to illuminate the specific position of the mat speaker 10 of the person with whom the operator remotely communicates, with a spotlight, to the terminal device 31 of the person via the communication control unit 305. With this configuration, as shown in a state 59, a specific position 60 of the mat speaker 10 of the person with whom the operator remotely communicates is illuminated by the spotlight. This configuration makes it possible to communicate what it refers to to the person with whom the operator communicates.

As described above, the remote communication system according to the present embodiment automatically determines the desire to talk on the basis of the operation of the application by using the input device by the operator or on the basis of the action of the operator, and presents the desire to talk, to the person with whom the operator remotely communicates, if the operator has the desire to talk. In addition, the remote communication system according to the present embodiment controls the light source in the vicinity of the mat speaker of the terminal device 30 or the light source in the vicinity of the mat speaker of the person with whom the operator communicates, according to an instruction using the input device by the operator. This configuration makes it possible to notify the person with whom the operator remotely communicates of the desire to talk or the timing at which the operator desires to talk, making it easy for the partner to talk. Therefore, communication can be activated.

Seventh Embodiment

Figure 23:
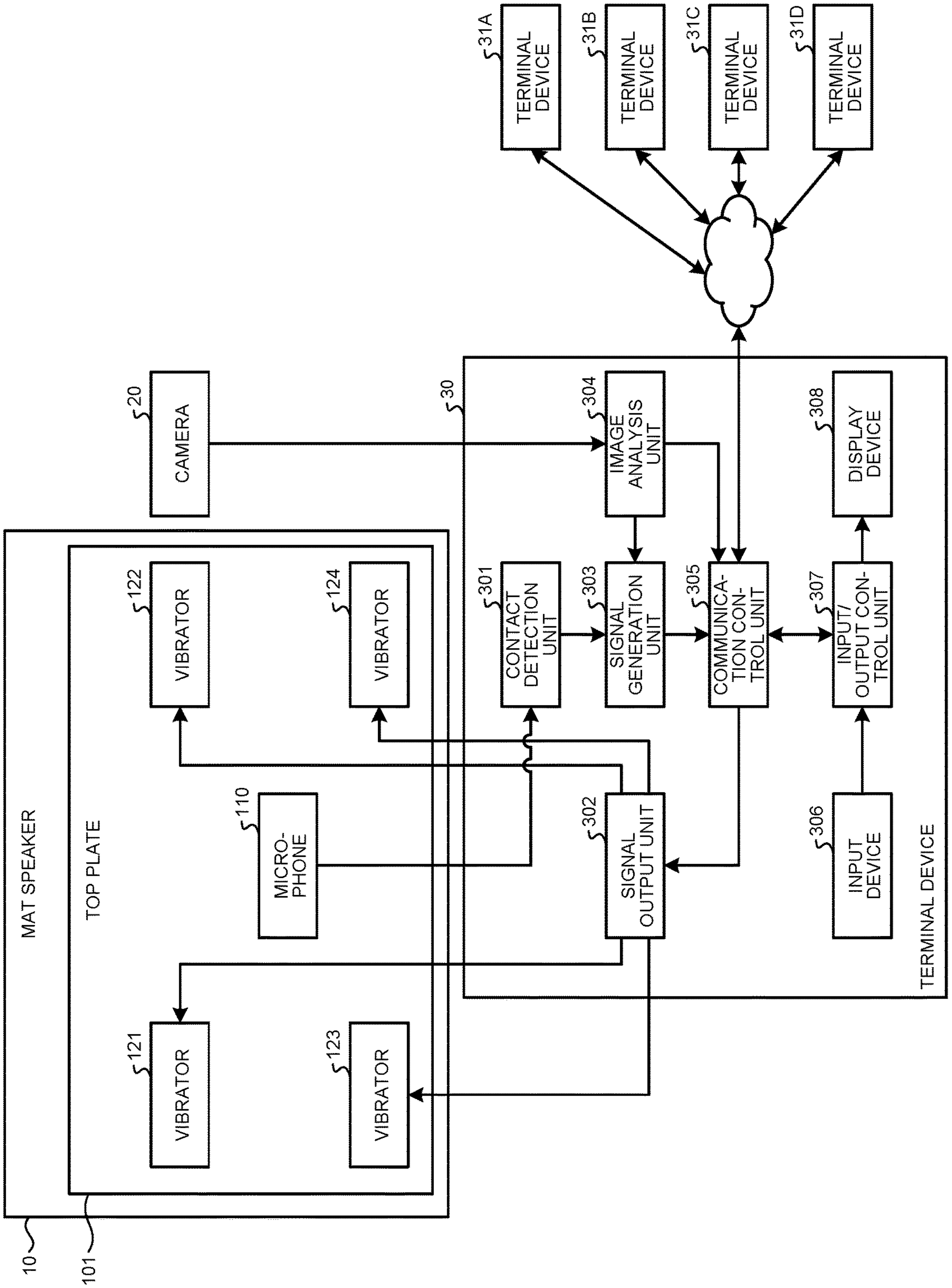
FIG. 23 is a block diagram of a remote communication system according to a seventh embodiment.

FIG. 23 is a block diagram of the remote communication system according to a seventh embodiment. For remote communication with a plurality of persons, the remote communication system 1 according to the present embodiment is configured to perform transmission/reception of the vibration signal in a manner that can identify each person. The mat speaker 10 according to the present embodiment includes one microphone 110 and four vibrators 121 to 124. In the following description, the vibrators 121 to 124 are referred to as vibrators 120 when not particularly distinguished. The action determination unit 311 is further included. In the following, descriptions of the operations of units similar to those in the first embodiment will be omitted.

Figure 24A:
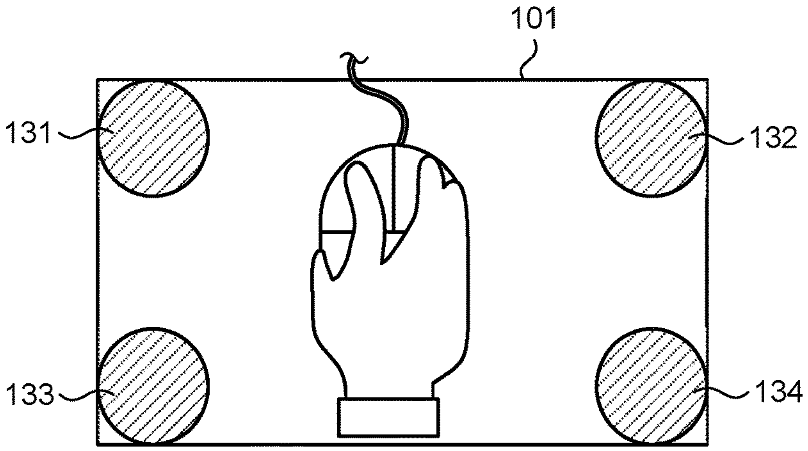
FIG. 24A is a plan view of the mat speaker placed on a desk as viewed from the opposite side of the desk.
Figure 24B:
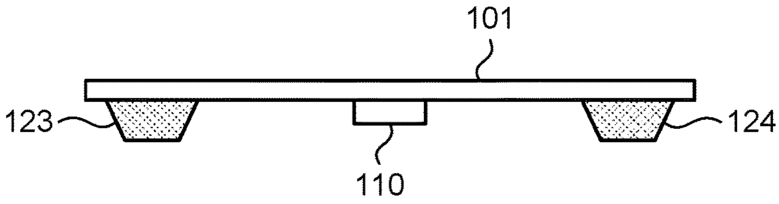
FIG. 24B is a side view of the mat speaker.
Figure 24C:
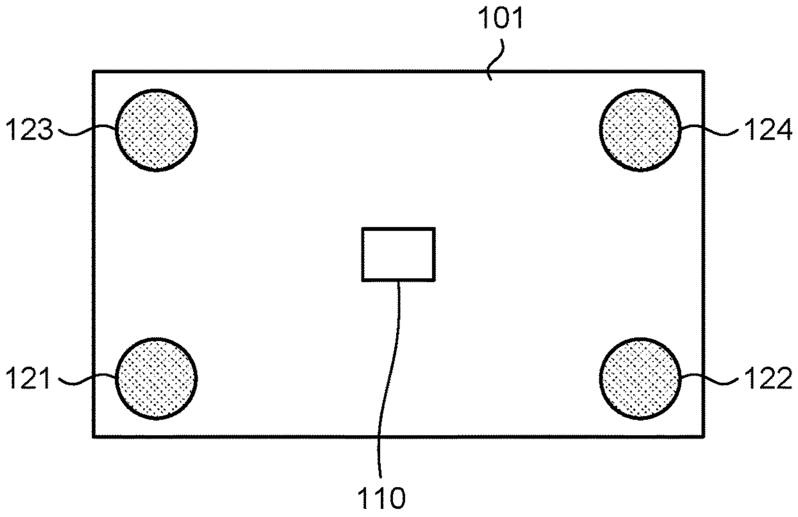
FIG. 24C is a plan view of the mat speaker placed on the desk as viewed from the desk side.

FIG. 24A is a plan view of the mat speaker placed on a desk as viewed from the opposite side of the desk. Hereinafter, a side visible in this state is referred to as a front side of the top plate 101. FIG. 24B is a side view of the mat speaker. FIG. 24C is a plan view of the mat speaker placed on the desk as viewed from the desk side. Hereinafter, a side visible in this state is referred to as a back side of the top plate 101.

The microphone 110 is disposed at the center of the back side of the top plate 101. The microphone 110 is a vibration sensor.

The vibrators 121 to 124 are each a vibration actuator and are disposed at four corners of the back side of the top plate 101. In the present embodiment, the vibrators 121 to 124 each serve as a pedestal of the mat speaker 10 as well. Regions 131 to 134 on the front side of the top plate 101 are located at positions facing the vibrators 121 to 124 and are each a region corresponding to each of the vibrators 121 to 124.

Figure 25:
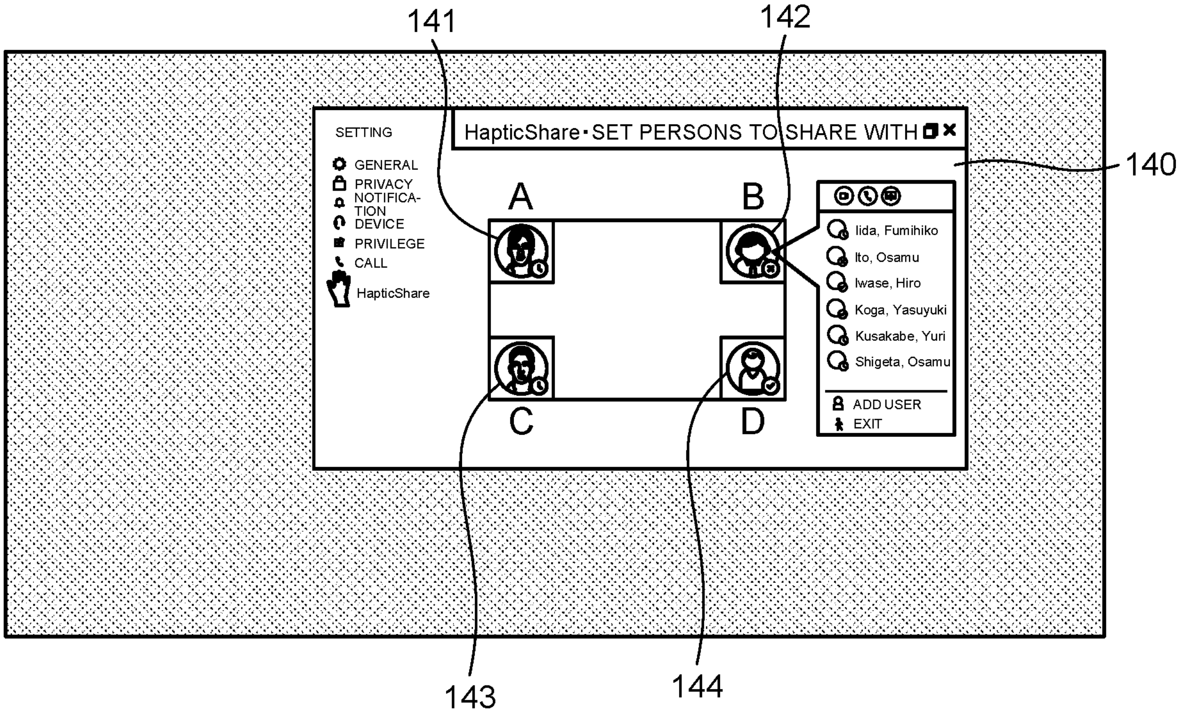
FIG. 25 is a diagram illustrating an example of a user interface used for remote communication with a plurality of persons.
Figure 25:
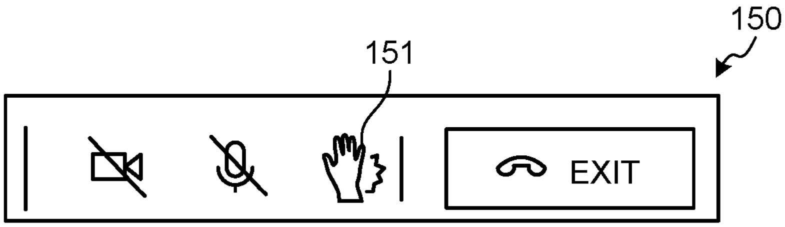

Different persons with whom the operator remotely communicates are assigned to the regions 131 to 134. The operator uses the input device 306 of the terminal device 30 to activate a region assignment application. FIG. 25 is a diagram illustrating an example of a user interface used for remote communication with the plurality of persons. When the region assignment application is activated, a setting user interface 140 illustrated in FIG. 25 is displayed on the display device 308. On the setting user interface 140, an image representing the front side of the top plate 101 is displayed, and icons 141 to 144 representing the regions 131 to 134 are displayed at four corners.

The operator uses the input device 306 to select each of the icons 141 to 144, for selecting the persons with whom the operator remotely communicates to be assigned to the corresponding regions 131 to 134. For example, the operator selects the icon 141 to assign a terminal device 31A operated by a person A to the region 131. Furthermore, the operator selects the icon 142 to assign a terminal device 31B operated by a person B to the region 132. Furthermore, the operator selects the icon 143 to assign a terminal device 31C operated by a person C to the region 133. Furthermore, the operator selects the icon 144 to assign a terminal device 31D operated by a person D to the region 134. Hereinafter, an example in which the terminal devices 31A to 31D are assigned to the regions 131 to 134 will be described.

The input/output control unit 307 receives an input of assignment information about each of the regions 131 to 133 from the input device 306. Then, the input/output control unit 307 outputs the assignment information about each of the regions 131 to 133 to the communication control unit 305.

Furthermore, during remote communication, the input/output control unit 307 causes the display device 308 to display a user interface 150 of FIG. 25 to display thereon. The user interface 150 includes a vibration sharing button 151, in addition to a screen sharing button, a sound sharing button, and an exit button. The operator can operate the vibration sharing button 151 to switch to vibration sharing, that is, whether to perform transmission/reception of the vibration signal. Here, turning on the vibration sharing button 151 for performance of the transmission/reception of the vibration signal will be described.

The image analysis unit 304 performs recognition of an image captured by the camera 20. Then, it is determined whether the operator touches any one of the regions 131 to 134 of the top plate 101. When the operator touches any one of the regions 131 to 134 of the top plate 101, the information about the any one of the regions 131 to 134 selected through touching by the operator is output to the signal generation unit 303 and the communication control unit 305.

The signal generation unit 303 acquires the assignment information about each of the regions 131 to 133, from the input/output control unit 307 and stores the information. Then, the signal generation unit 303 receives an instruction for generating the vibration signal from the contact detection unit 301. At this time, when any one of the regions 131 to 134 is selected, an input of information about the any one region selected from the regions 131 to 134 is received from the image analysis unit 304. Then, the signal generation unit 303 selects any of the terminal devices 31A to 31D corresponding to the area selected from the regions 131 to 134, and sets the selected device as a transmission destination of the vibration signal.

For example, when a notification indicating that the region 131 is selected is received from the image analysis unit 304, the signal generation unit 303 sets the terminal device 31A to which the region 131 is assigned, as the transmission destination of the vibration signal. Furthermore, when a notification indicating that the region 132 is selected is received from the image analysis unit 304, the signal generation unit 303 sets the terminal device 31B to which the region 132 is assigned, as the transmission destination of the vibration signal. Furthermore, when a notification indicating that the region 133 is selected is received from the image analysis unit 304, the signal generation unit 303 sets the terminal device 31C to which the region 133 is assigned, as the transmission destination of the vibration signal. Furthermore, when a notification indicating that the region 134 is selected is received from the image analysis unit 304, the signal generation unit 303 sets the terminal device 31C to which the region 134 is assigned, as the transmission destination of the vibration signal. In this way, the signal generation unit 303 determines the transmission destination of the vibration signal, on the basis of a result of the detection, and causes the communication control unit 305 to transmit the vibration signal.

When any one of the regions 131 to 134 is selected upon transmission of the vibration signal, the communication control unit 305 receives an input of the vibration signal to which the transmission destination is set. Then, the communication control unit 305 transmits the vibration signal to the transmission destination set to the vibration signal.

In addition, the communication control unit 305 acquires the assignment information about each of the regions 131 to 133, from the input/output control unit 307 and stores the information. Then, when receiving an input of the vibration signal from any of the terminal devices 31A to 31D, the communication control unit 305 identifies a transmission source of the vibration signal. When the transmission source is the terminal device 31A, the communication control unit 305 outputs the vibration signal to the signal output unit 302 and instructs the signal output unit 302 to vibrate the vibrator 121 corresponding to the region 131. Furthermore, when the transmission source is the terminal device 31B, the communication control unit 305 outputs the vibration signal to the signal output unit 302 and instructs the signal output unit 302 to vibrate the vibrator 122 corresponding to the region 132. When the transmission source is the terminal device 31C, the communication control unit 305 outputs the vibration signal to the signal output unit 302 and instructs the signal output unit 302 to vibrate the vibrator 123 corresponding to the region 133. When the transmission source is the terminal device 31D, the communication control unit 305 outputs the vibration signal to the signal output unit 302 and instructs the signal output unit 302 to vibrate the vibrator 124 corresponding to the region 134.

The signal output unit 302 receives an input of the vibration signal and an input of the instruction indicating whether to vibrate which of the vibrators 121 to 124. Then, the signal output unit 302 outputs the vibration signal to a vibrator 120 for which the instruction is given, of the vibrators 121 to 124, and vibrates the vibrator 120 for which the instruction is given. The operator can readily understand that the vibration has arrived from which one of the persons A to D who are the persons with whom the operator remotely communicates, according to a vibrated place from among the regions 131 to 134 on the top plate 101. In this way, on the basis of the vibration signal transmitted from another terminal device 31, the signal output unit 302 vibrates a vibrator 120 corresponding to the other terminal device 31 from among the plurality of vibrators 120.

Here, in the present embodiment, four actuators have been arranged on the top plate 101 and four regions 131 to 134 have been assigned, but regions, the number of which is larger than that of the regions 131 to 134, can be assigned by using the technology of tactile super-resolution.

Furthermore, in the present embodiment, upon selecting the transmission destination of the vibration signal, the image of the camera 20 has been analyzed to determine the transmission destination. However, the present embodiment is not limited thereto, and for example, a touch pad may be used as the top plate 101 to acquire information about a touched region so that the signal generation unit 303 may determine the transmission destination. In addition, three or more acceleration sensors may be arranged on the top plate 101 so that the signal generation unit 303 may determine the transmission destination on the basis of the balance of vibration intensities acquired from the acceleration sensors. Furthermore, a tilt sensor that detects the inclination of the top plate 101 may be arranged so that the signal generation unit 303 may determine the transmission destination on the basis of an inclination direction.

Vibration Signal Output Procedure According to Seventh Embodiment

Figure 26:
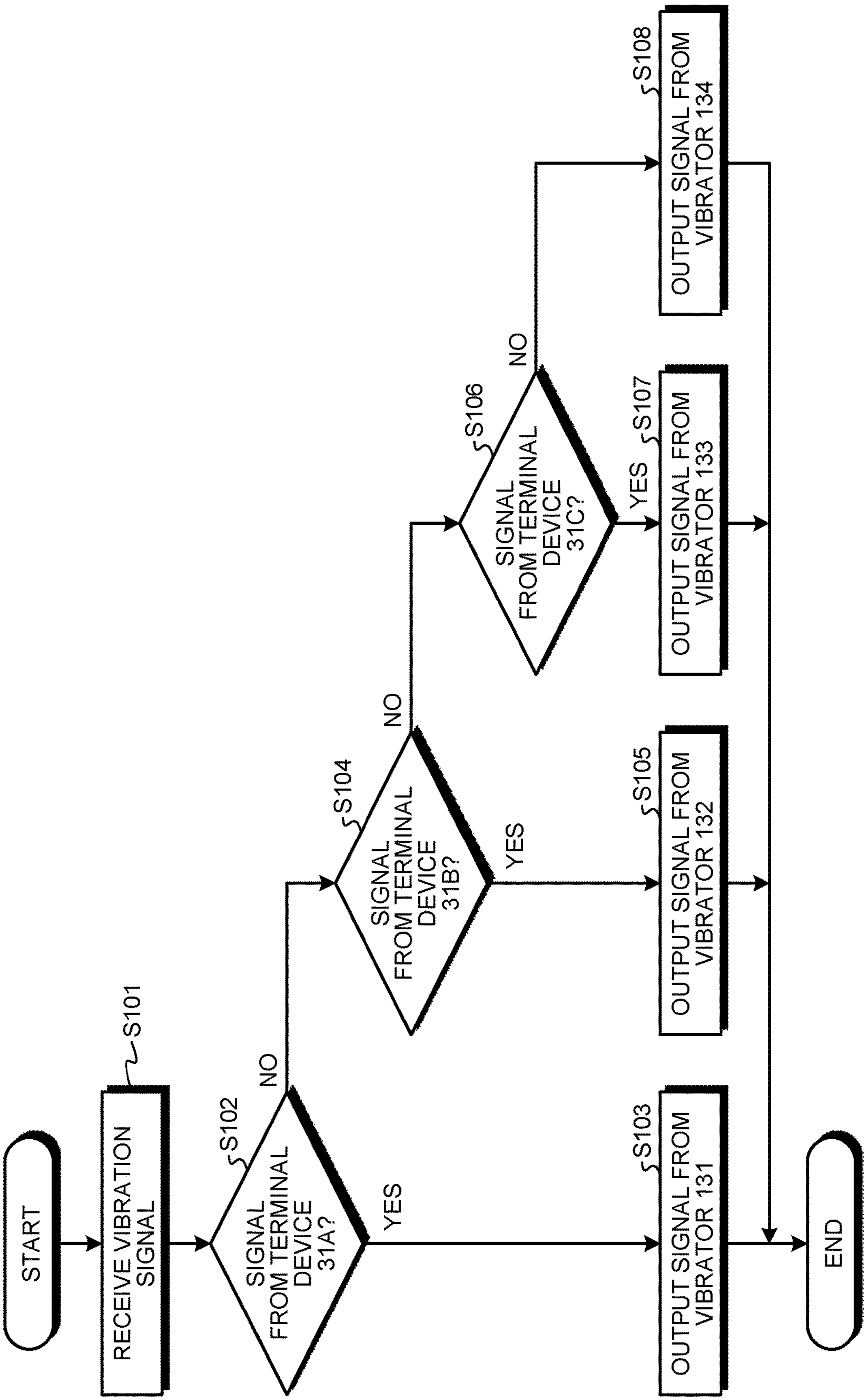
FIG. 26 is a flowchart of an output process for a received vibration signal according to a transmission source.

FIG. 26 is a flowchart of an output process for a received vibration signal according to a transmission source. Next, a procedure of the output process for the received vibration signal according to the transmission source thereof by the remote communication system 1 according to the present embodiment will be described with reference to FIG. 26.

The communication control unit 305 receives the vibration signal transmitted via the network (Step S101).

Next, the communication control unit 305 determines whether the received vibration signal is a signal from the terminal device 31A (Step S102). When the received vibration signal is the signal from the terminal device 31A (Step S102: affirmative), the communication control unit 305 instructs the signal output unit 302 to vibrate the vibrator 121. The signal output unit 302 outputs the vibration signal from the vibrator 121 (103).

On the other hand, when the received vibration signal is not the signal from the terminal device 31A (Step S102: negative), the communication control unit 305 determines whether the received vibration signal is a signal from the terminal device 31B (Step S104). When the received vibration signal is the signal from the terminal device 31B (Step S104: affirmative), the communication control unit 305 instructs the signal output unit 302 to vibrate the vibrator 122. The signal output unit 302 outputs the vibration signal from the vibrator 122 (Step S105).

On the other hand, when the received vibration signal is not the signal from the terminal device 31B (Step S104: negative), the communication control unit 305 determines whether the received vibration signal is a signal from the terminal device 31C (Step S106). When the received vibration signal is the signal from the terminal device 31C (Step S106: affirmative), the communication control unit 305 instructs the signal output unit 302 to vibrate the vibrator 123. The signal output unit 302 outputs the vibration signal from the vibrator 123 (Step S107).

On the other hand, when the received vibration signal is not the signal from the terminal device 31B (Step S106: negative), the communication control unit 305 instructs the signal output unit 302 to vibrate the vibrator 124. The signal output unit 302 outputs the vibration signal from the vibrator 124 (Step S108).

Vibration Signal Transmission Procedure According to Seventh Embodiment

Figure 27:
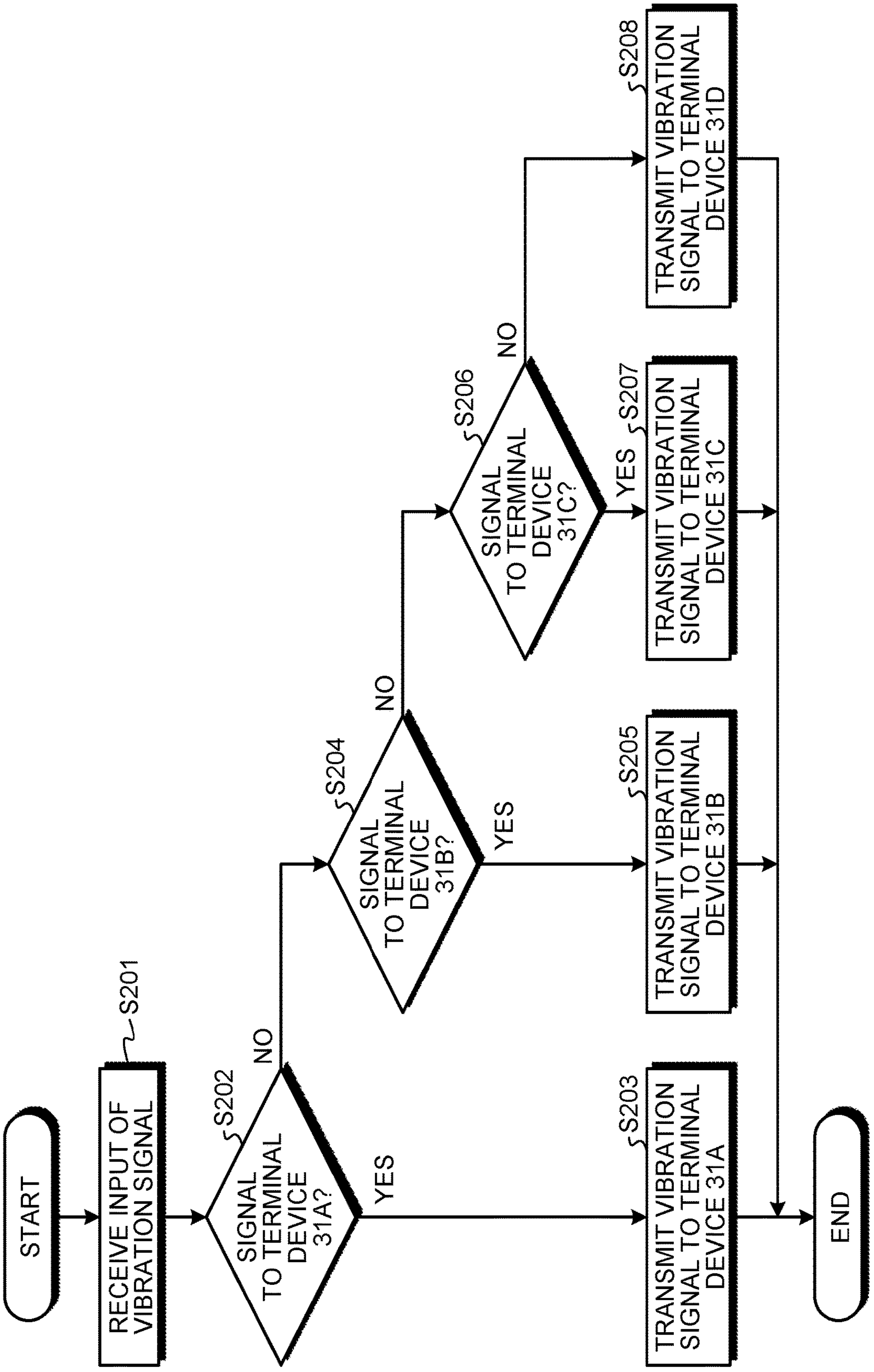
FIG. 27 is a flowchart of a transmission process for a vibration signal to be transmitted, according to a transmission destination.

FIG. 27 is a flowchart of a transmission process for a vibration signal to be transmitted, according to the transmission destination. Next, a procedure of the transmission process according to the transmission destination the vibration signal to be transmitted by the remote communication system 1 according to the present embodiment will be described with reference to FIG. 27.

The signal generation unit 303 receives the instruction for generating the vibration signal from the contact detection unit 301 (Step S201).

Next, the signal generation unit 303 generates the vibration signal and determines whether the vibration signal generated using a result of the recognition by the image analysis unit 304 is a signal to the terminal device 31A (Step S202). When the acquired vibration signal is a signal to the terminal device 31A (Step S202: affirmative), the signal generation unit 303 sets the transmission destination of the vibration signal to the terminal device 31A. The communication control unit 305 acquires the vibration signal from the signal generation unit 303 and transmits the vibration signal to the terminal device 31A as the set transmission destination (Step S203).

On the other hand, when the generated vibration signal is not the signal to the terminal device 31A (Step S202: negative), the signal generation unit 303 determines whether the generated vibration signal is a signal to the terminal device 31B (Step S204). When the generated vibration signal is the signal to the terminal device 31B (Step S204: affirmative), the signal generation unit 303 sets the transmission destination of the vibration signal to the terminal device 31B. The communication control unit 305 acquires the vibration signal from the signal generation unit 303 and transmits the vibration signal to the terminal device 31B as the set transmission destination (Step S205).

On the other hand, when the generated vibration signal is not the signal to the terminal device 31B (Step S204: negative), the signal generation unit 303 determines whether the generated vibration signal is a signal to the terminal device 31C (Step S206). When the generated vibration signal is a signal to the terminal device 31C (Step S206: affirmative), the signal generation unit 303 sets the transmission destination of the vibration signal to the terminal device 31C. The communication control unit 305 acquires the vibration signal from the signal generation unit 303 and transmits the vibration signal to the terminal device 31C as the set transmission destination (Step S207).

On the other hand, when the acquired vibration signal is not the signal to the terminal device 31C (Step S206: negative), the signal generation unit 303 sets the transmission destination of the vibration signal to the terminal device 31D. The communication control unit 305 acquires the vibration signal from the signal generation unit 303 and transmits the vibration signal to the terminal device 31D as the set transmission destination (Step S208).

As described above, the terminal device according to the present embodiment have different positions to be vibrated on the top plate, according to the transmission source of the vibration signal. In addition, the terminal device according to the present embodiment transmits the vibration signal to different transmission destinations according to a specified position on the top plate. This configuration makes it possible to achieve communication with the plurality of persons by using the vibration, recognizing the transmission source of each piece of information. Furthermore, it is possible to selectively communicate with a specific person from among the plurality of persons with whom the operator communicates. Therefore, communication with the individual persons is facilitated, enabling activated communication using remote communication.

Note that in the above embodiments, the vibrator is arranged on the mat speaker, but the arrangement position of the vibrator is not limited thereto, and for example, the vibrator may be arranged in the terminal device such as a smartphone or a smart watch to vibrate the terminal device itself.

Hardware Configuration

A series of the process steps described above can be executed by hardware or software. In a case where the series of process steps is executed by software, programs constituting the software are installed on a computer. Here, examples of the computer include a computer that is incorporated in dedicated hardware, a general-purpose computer that is configured to execute various functions by installing various programs, and the like.

Figure 28:
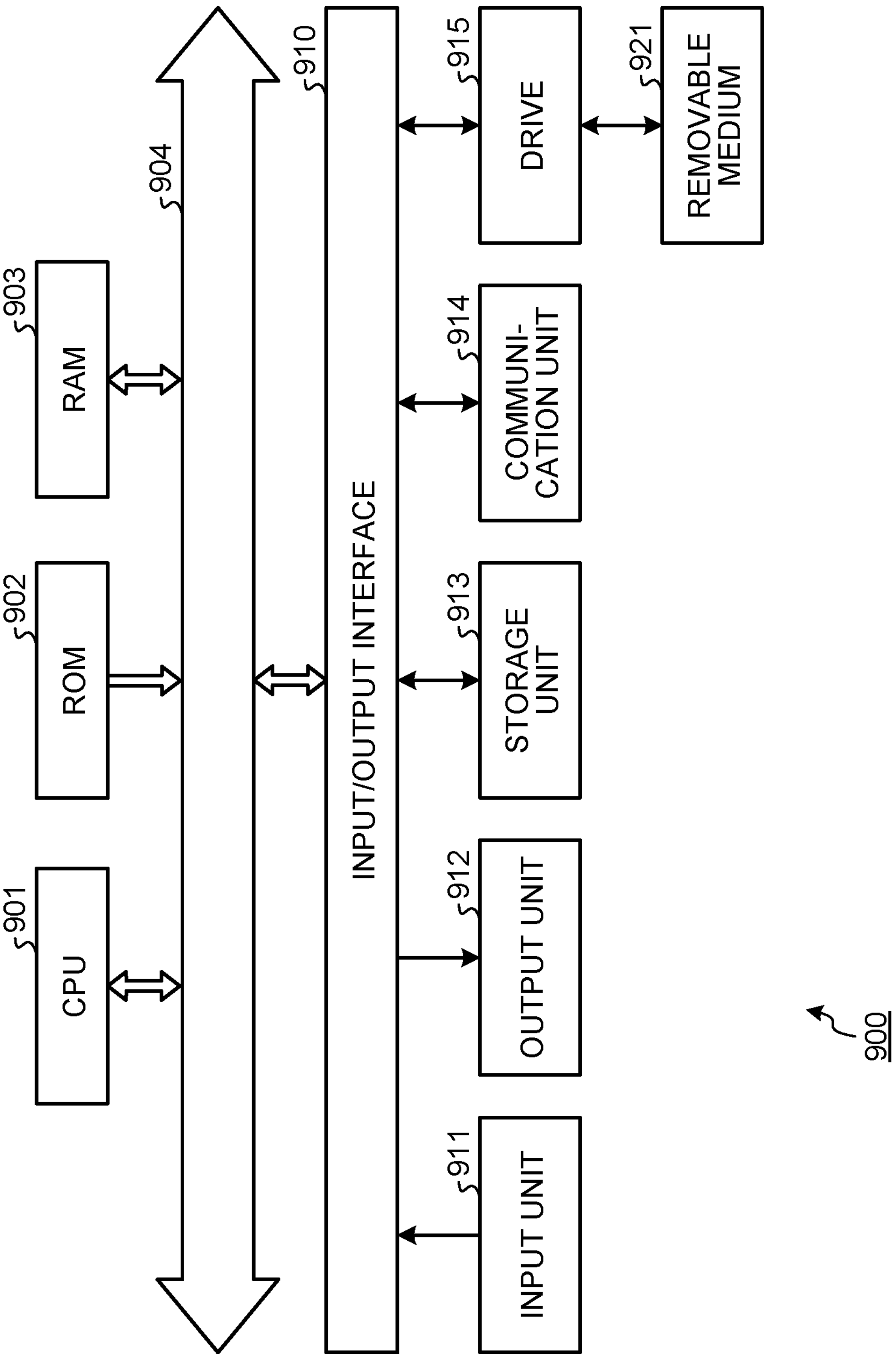
FIG. 28 is a hardware configuration diagram of a terminal device.

FIG. 28 is a hardware configuration diagram of a terminal device. The terminal device 30 is implemented by a computer 900 illustrated in FIG. 28. In the computer 900, a central processing unit (CPU) 901, a read only memory (ROM) 902, and a random access memory (RAM) 903 are connected to each other via a bus 904.

An input/output interface 910 is also connected to the bus 904. An input unit 911, an output unit 912, a storage unit 913, a communication unit 914, and a drive 915 are connected to the input/output interface 910.

The input unit 911 includes, for example, a keyboard, a mouse, a microphone, a touch screen, an input terminal, and the like. The output unit 912 includes, for example, a display, a speaker, an output terminal, and the like. The storage unit 913 includes, for example, a hard disk, a RAM disk, a non-volatile memory, and the like. The communication unit 914 includes, for example, a network interface. The drive 915 drives a removable medium 921 such as a magnetic disk, optical disk, magneto-optical disk, or semiconductor memory.

In the computer configured as described above, the CPU 901 loads, for example, programs stored in the storage unit 913 into the RAM 903 via the input/output interface 910 and the bus 904, for execution, and the series of process steps described above are executed. The RAM 903 also appropriately stores data necessary to execute various processing by the CPU 901.

For example, a program executed by the CPU 901 can be applied by being recorded in the removable medium 921 as a package medium or the like. In this configuration, when the removable medium 921 is inserted into the drive 915, the program can be installed in the storage unit 913 via the input/output interface 910.

Furthermore, the program can also be provided via a wired or wireless transmission medium such as a local area network, the Internet, and digital satellite broadcast. In this configuration, the program is allowed to be received by the communication unit 914 and installed in the storage unit 913.

In addition, the program is allowed to be installed in the ROM 902 or the storage unit 913 in advance.

The embodiments of the present disclosure have been described above, but the technical scope of the present disclosure is not strictly limited to the embodiments described above, and various modifications and alterations can be made without departing from the spirit and scope of the present disclosure. Moreover, the component elements of different embodiments and modifications may be suitably combined with each other.

Note that the effects described herein are merely examples and are not limited to the description, and other effects may be provided.

Note that the present technology can also have the following configurations.

(1)

An information processing system comprising:

a signal generation unit that generates a vibration signal based on vibration measured by a vibration sensor provided at a mat and a result of detection of an object placed on the mat; and a signal output unit that vibrates a vibration mechanism based on the vibration signal generated by the signal generation unit.

(2)

The information processing system according to (1), further comprising a plurality of information processing devices, wherein each of the information processing devices includes:

the mat;

the vibration mechanism;

the signal generation unit;

a communication control unit that transmits the vibration signal generated by the signal generation unit to another information processing device; and the signal output unit that vibrates the vibration mechanism based on the vibration signal transmitted from the other information processing device.

(3)

The information processing system according to (1), further comprising an image analysis unit that analyzes an image of a camera capturing the object placed on the mat to recognize the object, wherein the signal generation unit generates the vibration signal based on the vibration measured by the vibration sensor and a result of the recognition of the object by the image analysis unit.

(4)

The information processing system according to (3), wherein the signal generation unit generates a basic vibration signal from the vibration measured by the vibration sensor, generates additional vibration based on the result of the recognition of the object, and adds the additional vibration to the basic vibration signal to generate the vibration signal.

(5)

The information processing system according to (3) or (4), wherein the signal generation unit generates the vibration signal based on an appearance of the object, upon failure in the recognition of the object by the image analysis unit.

(6)

The information processing system according to any one of (1) to (5), wherein the signal generation unit receives a notification indicating detection of the predetermined action from a sensor-mounted mechanism detecting the predetermined action, and generates a predetermined vibration signal determined in advance.

(7)

The information processing system according to any one of (1) to (6), further comprising a content selection unit that, when a plurality of individual objects is detected as the object placed on the mat, uses a predetermined priority of each of the individual objects to select one or some of the individual objects, wherein the signal generation unit generates the vibration signal, based on a result of the detection of the individual objects selected by the content selection unit.

(8)

The information processing system according to any one of (1) to (7), further comprising a device selection unit that selects one or a plurality of specific information acquisition devices from among a plurality of information acquisition devices, wherein the signal generation unit generates the vibration signal based on acquisition information obtained from the specific information acquisition devices selected by the device selection unit.

(9)

The information processing system according to any one of (1) to (8), wherein the signal output unit suppresses vibration of the vibration mechanism caused by the vibration signal, based on the result of the detection of the object placed on the mat.

(10)

The information processing system according to any one of (1) to (9), further comprising an action determination unit that determines an operation by an operator or an action of the operator to perform one or both of processing of transmitting a predetermined signal according to a result of the determination and processing of causing the signal generation unit to generate the vibration signal based on the result of the determination, wherein the signal generation unit generates the vibration signal corresponding to the result of the determination when receiving an instruction from the action determination unit.

(11)

The information processing system according to any one of (1) to (10), wherein the signal generation unit determines a transmission destination of the vibration signal based on the result of the detection.

(12)

The information processing system according to any one of (1) to (11), wherein the vibration mechanism includes a plurality of vibrators, and the signal output unit vibrates a vibrator corresponding to the vibration signal from among the plurality of vibrators.

(13)

A control method comprising:

generating a vibration signal based on vibration measured by a vibration sensor provided at a mat and a result of detection of an object placed on the mat; and vibrating a vibration mechanism based on the generated vibration signal.

(14)

A control program causing a computer to execute processing of:

generating a vibration signal based on vibration measured by a vibration sensor provided at a mat and a result of detection of an object placed on the mat; and vibrating a vibration mechanism based on the generated vibration signal.

REFERENCE SIGNS LIST

1 REMOTE COMMUNICATION SYSTEM
10 MAT SPEAKER
20 CAMERA
30, 31, 31A to 31D TERMINAL DEVICE
40 SENSOR-MOUNTED BUTTON
41 HEADSET
42 EXTERNAL MICROPHONE
43 LIGHT SOURCE
44 EXTERNAL SENSOR
101 TOP PLATE
102 COMMUNICATION MECHANISM
110 MICROPHONE
120 to 124 VIBRATOR
301 CONTACT DETECTION UNIT
302 SIGNAL OUTPUT UNIT
303 SIGNAL GENERATION UNIT
304 IMAGE ANALYSIS UNIT
305 COMMUNICATION CONTROL UNIT
306 INPUT DEVICE
307 INPUT/OUTPUT CONTROL UNIT
308 DISPLAY DEVICE
309 CONTENT SELECTION UNIT
310 DEVICE SELECTION UNIT
311 ACTION DETERMINATION UNIT

The invention claimed is:

1. An information processing system comprising:

a signal generation unit that generates a vibration signal based on vibration measured by a vibration sensor provided at a mat and a result of detection of an object placed on the mat; and a signal output unit that vibrates a vibration mechanism including an eccentric motor at the mat based on the vibration signal generated by the signal generation unit, wherein the eccentric motor is configured to vibrate a finger of a user when the finger is placed on the mat.

2. The information processing system according to claim 1, further comprising a plurality of information processing devices, wherein each of the information processing devices includes:

the mat;

the vibration mechanism;

the signal generation unit;

a communication control unit that transmits the vibration signal generated by the signal generation unit to another information processing device; and the signal output unit that vibrates the vibration mechanism based on the vibration signal transmitted from the other information processing device.

3. The information processing system according to claim 1, further comprising an image analysis unit that analyzes an image of a camera capturing the object placed on the mat to recognize the object, wherein the signal generation unit generates the vibration signal based on the vibration measured by the vibration sensor and a result of the recognition of the object by the image analysis unit.

4. The information processing system according to claim 3, wherein the signal generation unit generates a basic vibration signal from the vibration measured by the vibration sensor, generates additional vibration based on the result of the recognition of the object, and adds the additional vibration to the basic vibration signal to generate the vibration signal.

5. The information processing system according to claim 3, wherein the signal generation unit generates the vibration signal based on an appearance of the object, upon failure in the recognition of the object by the image analysis unit.

6. The information processing system according to claim 1, wherein the signal generation unit receives a notification indicating detection of the predetermined action from a sensor-mounted mechanism detecting the predetermined action, and generates a predetermined vibration signal determined in advance.

7. The information processing system according to claim 1, further comprising a content selection unit that, when a plurality of individual objects is detected as the object placed on the mat, uses a predetermined priority of each of the individual objects to select one or some of the individual objects, wherein the signal generation unit generates the vibration signal, based on a result of the detection of the individual objects selected by the content selection unit.

8. The information processing system according to claim 1, further comprising a device selection unit that selects one or a plurality of specific information acquisition devices from among a plurality of information acquisition devices, wherein the signal generation unit generates the vibration signal based on acquisition information obtained from the specific information acquisition devices selected by the device selection unit.

9. The information processing system according to claim 1, wherein the signal output unit suppresses vibration of the vibration mechanism caused by the vibration signal, based on the result of the detection of the object placed on the mat.

10. The information processing system according to claim 1, further comprising an action determination unit that determines an operation by an operator or an action of the operator to perform one or both of processing of transmitting a predetermined signal according to a result of the determination and processing of causing the signal generation unit to generate the vibration signal based on the result of the determination, wherein the signal generation unit generates the vibration signal corresponding to the result of the determination when receiving an instruction from the action determination unit.

11. The information processing system according to claim 1, wherein the signal generation unit determines a transmission destination of the vibration signal based on the result of the detection.

12. The information processing system according to claim 1, wherein the vibration mechanism includes a plurality of vibrators, and the signal output unit vibrates a vibrator corresponding to the vibration signal from among the plurality of vibrators.

13. A control method comprising:

generating a vibration signal based on vibration measured by a vibration sensor provided at a mat and a result of detection of an object placed on the mat; and vibrating a vibration mechanism including an eccentric motor at the mat based on the generated vibration signal, wherein the eccentric motor vibrates a finger of a user when the finger is placed on the mat.

14. A control program on non-transitory computer-readable storage medium causing a computer to execute processing of:

generating a vibration signal based on vibration measured by a vibration sensor provided at a mat and a result of detection of an object placed on the mat; and vibrating a vibration mechanism including an eccentric motor at the mat based on the generated vibration signal, wherein the eccentric motor is configured to vibrate a finger of a user when the finger is placed on the mat.

* * * * *